(12) United States Patent
Zyto et al.

(10) Patent No.: US 10,798,150 B2
(45) Date of Patent: Oct. 6, 2020

(54) METHOD AND APPARATUS FOR COORDINATING TASKS AMONG A PLURALITY OF USERS

(71) Applicant: HERE GLOBAL B.V., Eindhoven (NL)

(72) Inventors: Sacha Zyto, Brighton, MA (US); Gopalakrishna Raghavan, Winchester, MA (US); Mark Alder, Lexington, MA (US); Mark Peterson, Quincy, MA (US)

(73) Assignee: HERE Global B.V., Eindhoven (NL)

( * ) Notice: Subject to any disclaimer, the term of this patent is extended or adjusted under 35 U.S.C. 154(b) by 1363 days.

(21) Appl. No.: 13/853,659

(22) Filed: Mar. 29, 2013

(65) Prior Publication Data

US 2014/0297743 A1 Oct. 2, 2014

(51) Int. Cl.
*H04L 29/08* (2006.01)
*G06Q 10/06* (2012.01)

(52) U.S. Cl.
CPC ........ *H04L 67/10* (2013.01); *G06Q 10/06311* (2013.01); *H04L 67/18* (2013.01); *H04L 67/22* (2013.01)

(58) Field of Classification Search
CPC .. G06Q 10/10; G06Q 10/06311; G06Q 10/06; H04L 29/06; H04L 12/581; H04L 29/08072; H04L 29/06027; H04L 67/10; H04L 67/18; H04L 67/22; H04L 29/08
USPC ........... 709/204; 370/260; 707/770; 715/733
See application file for complete search history.

(56) References Cited

U.S. PATENT DOCUMENTS

| 7,945,470 | B1 * | 5/2011 | Cohen | G06Q 10/06 705/7.13 |
|---|---|---|---|---|
| 8,121,888 | B1 * | 2/2012 | Cohen | G06Q 10/00 705/7.38 |
| 8,219,432 | B1 * | 7/2012 | Bradley | G06Q 10/06311 705/7.13 |
| 8,271,987 | B1 * | 9/2012 | Willeford | G06Q 10/06311 718/104 |
| 2003/0063072 | A1 * | 4/2003 | Brandenberg | H04M 1/0233 345/173 |
| 2004/0143636 | A1 * | 7/2004 | Horvitz | H04L 29/06 709/207 |
| 2006/0225076 | A1 * | 10/2006 | Longobardi | G06Q 10/06 718/102 |
| 2009/0054043 | A1 * | 2/2009 | Hamilton | G01S 5/0294 455/414.2 |
| 2010/0004005 | A1 * | 1/2010 | Pereira | H04L 67/18 455/457 |
| 2011/0071893 | A1 * | 3/2011 | Malhotra | G06Q 10/109 705/14.23 |

(Continued)

*Primary Examiner* — Tonia L Dollinger
*Assistant Examiner* — Mehulkumar J Shah
(74) *Attorney, Agent, or Firm* — Ditthavong & Steiner, P.C.

(57) ABSTRACT

An approach is provided for efficiently coordinating one or more tasks among a plurality of users. A service provider may determine one or more contextual criteria for at least one task associated with at least one user. The service provider may further cause a selection of one or more contacts associated with the at least one user based on the one or more contextual criteria. Additionally, the service provider may cause a presentation of the at least one task to the one or more contacts.

20 Claims, 19 Drawing Sheets

(56) References Cited

U.S. PATENT DOCUMENTS

| | | | | |
|---|---|---|---|---|
| 2011/0194682 A1* | 8/2011 | Hans | G06Q 10/107 | 379/201.04 |
| 2011/0202406 A1* | 8/2011 | Suomela | | 705/14.52 |
| 2011/0288868 A1* | 11/2011 | Lloyd | H04M 1/271 | 704/251 |
| 2012/0209654 A1* | 8/2012 | Romagnino | G16H 40/20 | 705/7.27 |
| 2012/0289254 A1* | 11/2012 | Dishneau | G06Q 10/1097 | 455/456.3 |
| 2013/0212176 A1* | 8/2013 | Koulomzin | G06Q 50/01 | 709/204 |
| 2013/0322613 A1* | 12/2013 | Clayton | H04M 3/4935 | 379/202.01 |
| 2014/0108078 A1* | 4/2014 | Davis | G06Q 30/0611 | 705/7.14 |
| 2014/0173602 A1* | 6/2014 | Kikin-Gil | G06Q 10/1097 | 718/100 |

* cited by examiner

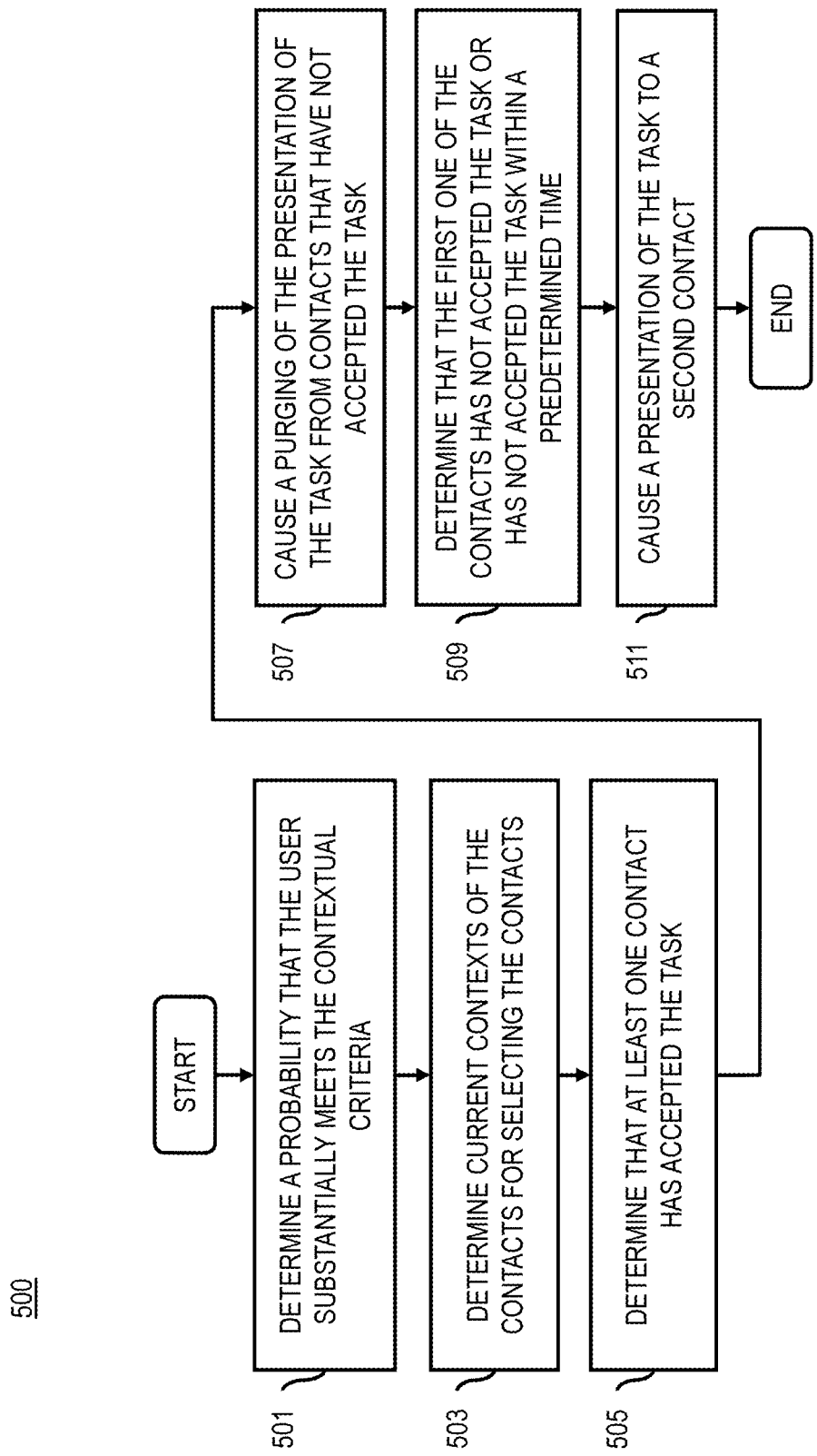

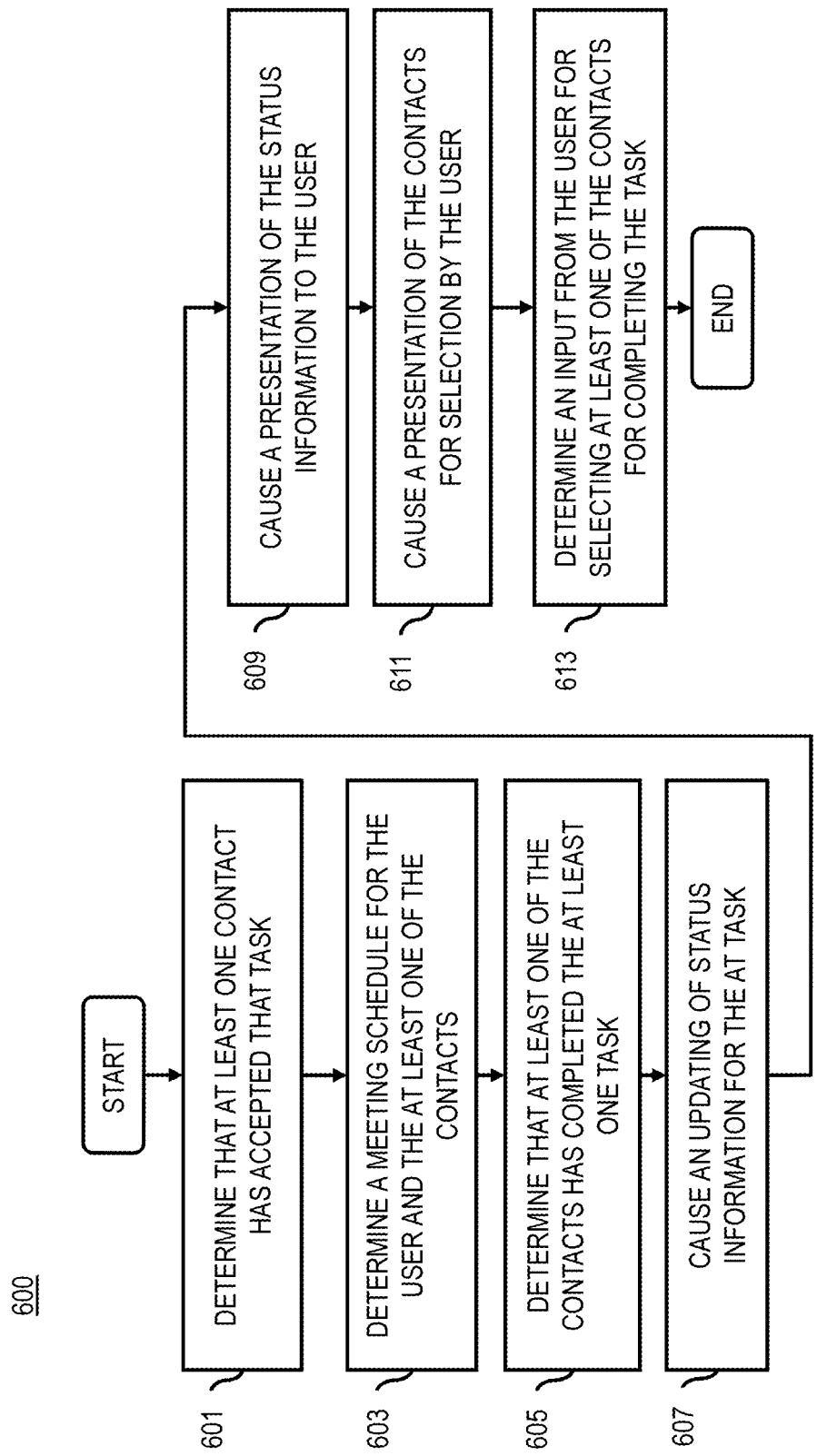

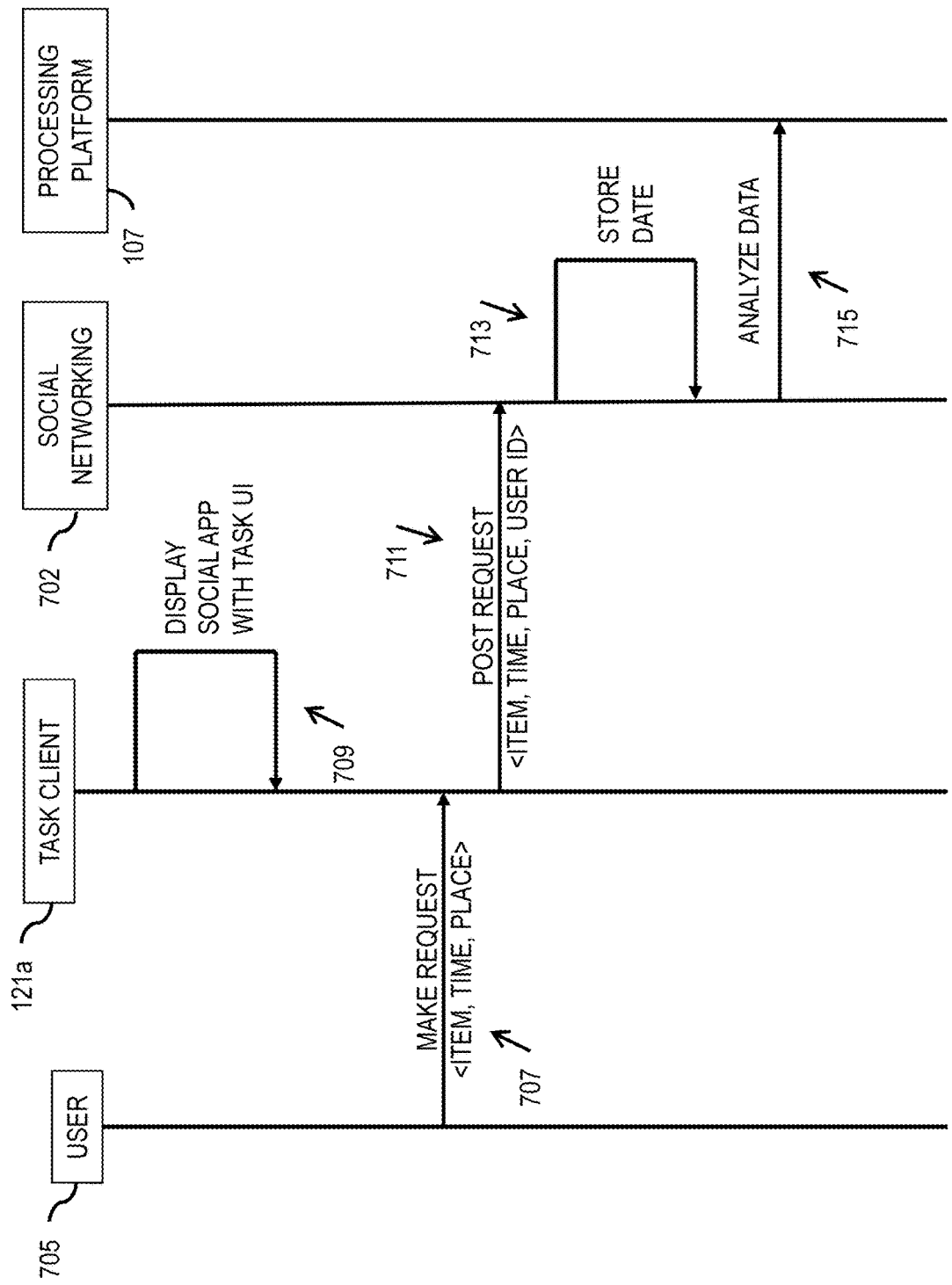

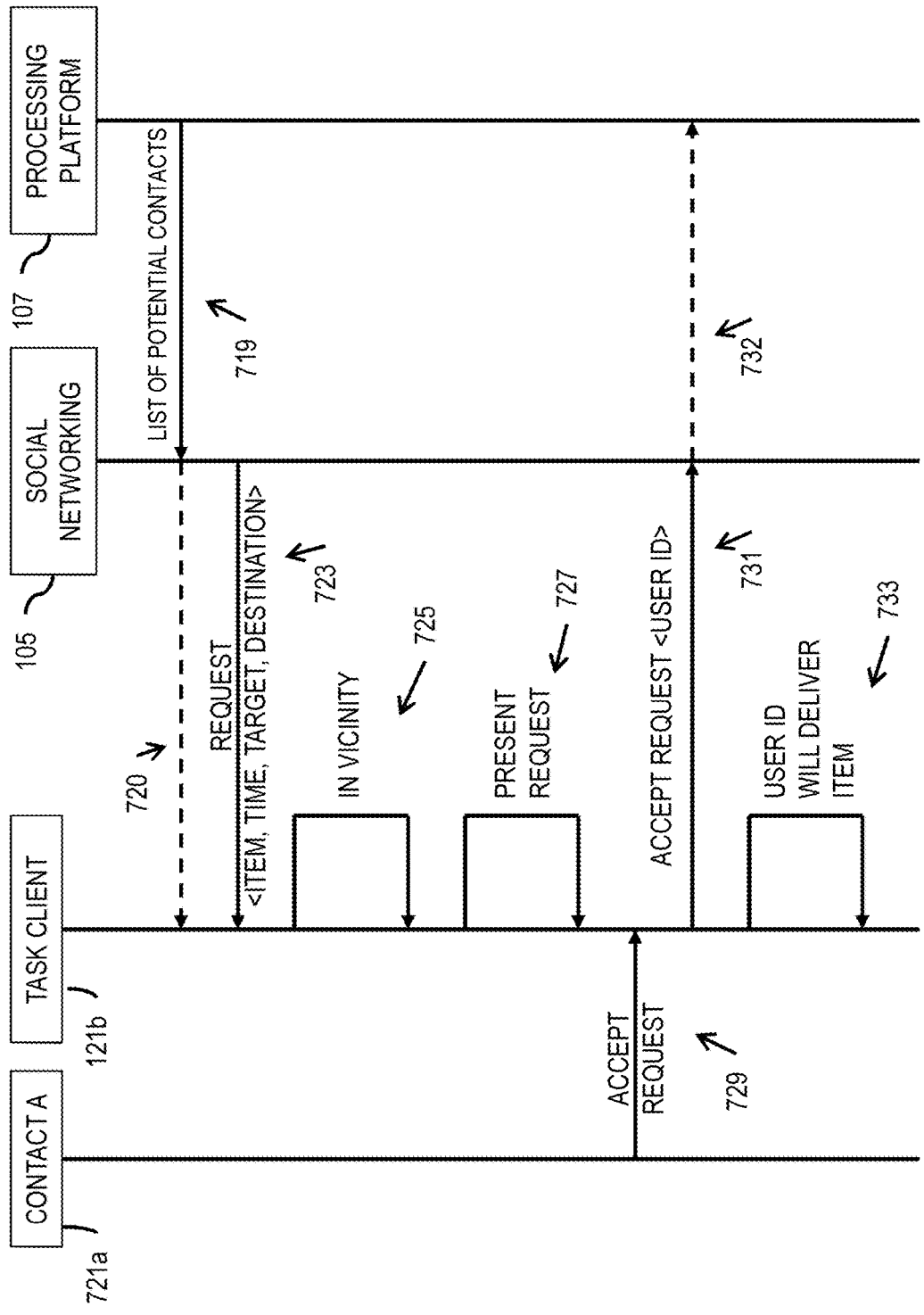

METHOD AND APPARATUS FOR COORDINATING TASKS AMONG A PLURALITY OF USERS

BACKGROUND

Service providers are continually challenged to deliver value and convenience to consumers by providing compelling network services and advancing the underlying technologies. On area of interest has been development in use of social networking sites to communicate and share various information and content among users. For example a user may use the social networking sites to update status and share desired information and content with friend, family members, colleagues, and the like. In various situations the shared information may be propagated to other users based on various criteria set by the user and/or by those users who may be interested in receiving updates associated with the user. In some scenarios, users may utilize one or more social networking sites to request assistance from a plurality of other users on performing various tasks. For example, a user may need help with a certain project, which he may post at one or more social networking sites so that other users associated with the user may notice the posting and choose to participate/assist. However, at times, posting a task at a social networking site may be imposing on other users or may not be a most efficient approach as the task may be time sensitive or may need to be presented to and coordinated with certain users.

SOME EXAMPLE EMBODIMENTS

Therefore, there is a need for an approach for efficiently coordinating one or more tasks among a plurality of users.

According to one embodiment, a method comprises determining one or more contextual criteria for at least one task associated with at least one user. The method also comprises causing, at least in part, a selection of one or more contacts associated with the at least one user based, at least in part, on the one or more contextual criteria. The method further comprises causing, at least in part, a presentation of the at least one task to the one or more contacts.

According to another embodiment, an apparatus comprises at least one processor, and at least one memory including computer program code for one or more computer programs, the at least one memory and the computer program code configured to, with the at least one processor, cause, at least in part, the apparatus to determine one or more contextual criteria for at least one task associated with at least one user. The apparatus is also caused to cause, at least in part, a selection of one or more contacts associated with the at least one user based, at least in part, on the one or more contextual criteria. The apparatus is further caused to cause, at least in part, a presentation of the at least one task to the one or more contacts.

According to another embodiment, a computer-readable storage medium carries one or more sequences of one or more instructions which, when executed by one or more processors, cause, at least in part, an apparatus to determine one or more contextual criteria for at least one task associated with at least one user. The apparatus is also caused to cause, at least in part, a selection of one or more contacts associated with the at least one user based, at least in part, on the one or more contextual criteria. The apparatus is further caused to cause, at least in part, a presentation of the at least one task to the one or more contacts.

According to another embodiment, an apparatus comprises means for comprises determining one or more contextual criteria for at least one task associated with at least one user. The apparatus also comprises means for causing, at least in part, a selection of one or more contacts associated with the at least one user based, at least in part, on the one or more contextual criteria. The apparatus further comprises means for causing, at least in part, a presentation of the at least one task to the one or more contacts.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4 through 6 illustrate flowcharts of various processes for, at least, efficiently coordinating one or more tasks among a plurality of users, according to various embodiments;

FIGS. 7A through 7G illustrate timing diagrams of example process steps for efficiently coordinating one or more tasks among a plurality of users, according to various embodiments;

DESCRIPTION OF SOME EMBODIMENTS

Examples of a method, apparatus, and computer program for efficiently coordinating one or more tasks among a plurality of users. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
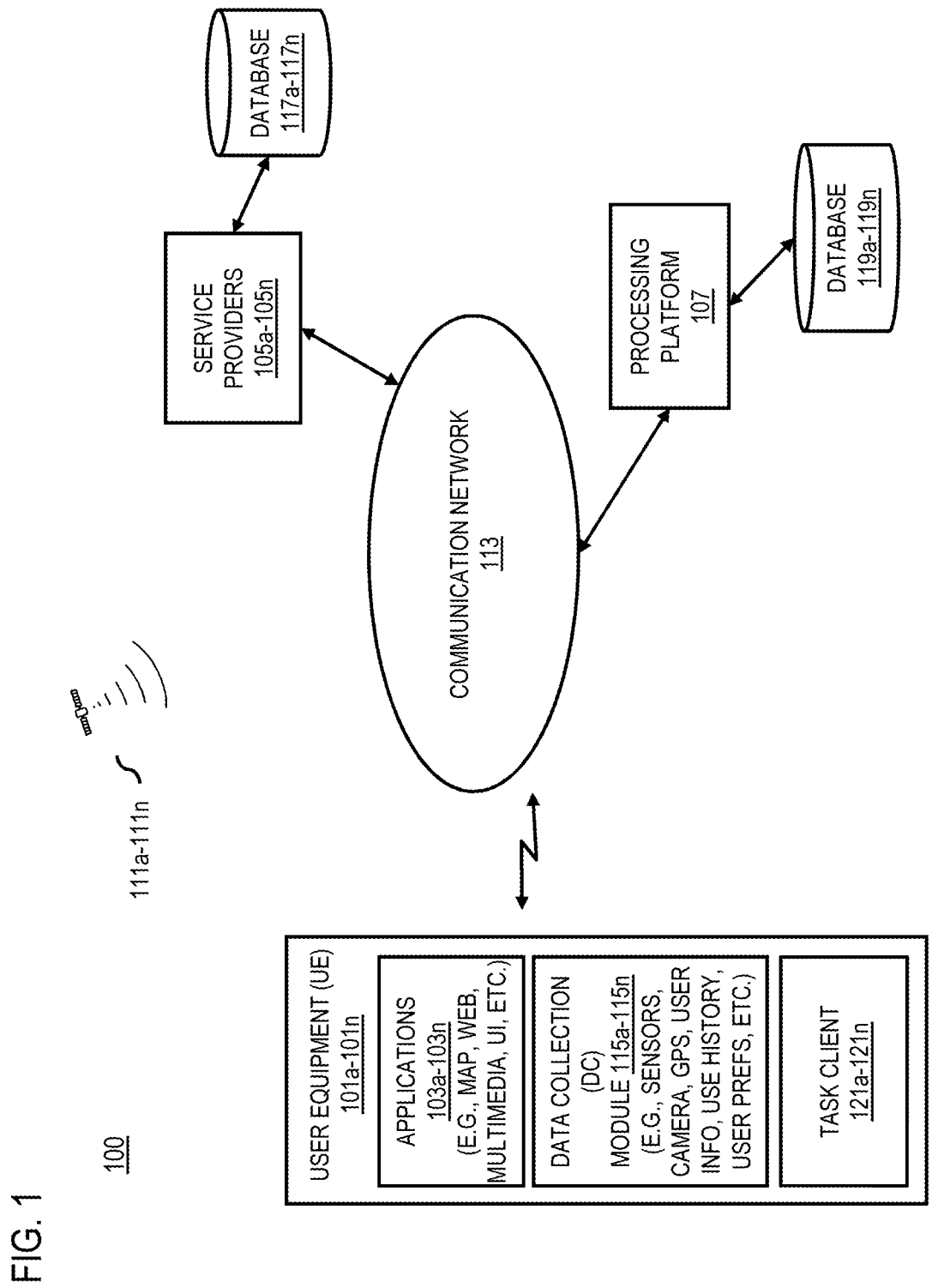
FIG. 1 is a diagram of a system capable of efficiently coordinating one or more tasks among a plurality of users, according to an embodiment.

FIG. 1 is a diagram of a system capable of efficiently coordinating one or more tasks among a plurality of users. As discussed, a user may wish to request for assistance from various contacts (e.g., friend, social networking contacts, colleagues, etc.) to complete a task that the user may not be able to immediately or efficiently attend to. For example, the user may need a certain item from a local store and would like to check if any of the user's contacts may be able to obtain the item and deliver to the user. In another example, the user may wish to obtain an item (e.g., a souvenir) from a particular region (e.g., country, city, state, etc.) and would like to check if any of the user's contact may be in that particular region and able to obtain the item for the user. Traditionally, the user may personally communicate (e.g., emails, phone calls, SMS messages, etc.) the request to a plurality of contacts, however, the personal communication may be time consuming, limited to a few contacts, annoying to the contacts, and/or not as effective as communicating the request to a potentially broader range of contacts. Further, direct personal communications to the contacts may be intrusive for the contacts as it may be time consuming for them to respond, or they may not have an option to respond anonymously if they don't wish to assist with the task.

To address, at least these problems, a system 100 of FIG. 1 introduces the capability for efficiently coordinating one or more tasks among a plurality of users. As users develop a plethora of contacts via a broad range of social networking options, it may be challenging for a user to efficiently coordinate with the contacts a request from the user for assistance with one or more tasks without spamming all or a majority number of the user's contacts. In various scenarios, a user may utilize a centralized approach for broadcasting a request for assistance with a task to potential contacts who may be best capable to assist with the task. For example, the user may send a request to a service provider that may process and analyze the task criteria, and then determine one or more contacts of the user who may be able to assist/fulfill with the task. In various embodiments, the service provider may utilize criteria of a task, information of a user requesting the task, various information associated with the user's contacts (e.g., friends, social networking contacts, etc.), and the like for determining one or more contacts who may be able to efficiently perform the requested task. For example, location information of a user, of a task, and a plurality of contacts may be utilized in determining one or more potential contacts.

In one scenario, a user may need an item (e.g., milk) from a local store but may be unable to go to the store (e.g., with a baby), where the user may submit a request to a service provider so that the service provider may broadcast the request to a plurality of contacts associated with the user so that the contacts may see the request from the user. In one instance, an accepting contact who chooses to assist with the request may respond back to the service provider and/or to the user indicating that the accepting contact will fulfill the task requirements. In one instance, other contacts who see the request for the task may respond back to the service provider indicating that they cannot assist with the request or they may simply ignore the request.

In one scenario, the service provider may determine one or more potential contacts for assisting with a task requested by a user based on the task criteria. For example, the task criteria may include one or more items requested by the user, nearest location where the items may be obtained at (e.g., a store), location of the potential contacts (e.g., via status information at one or more social networking sites) with reference to the location of the user and/or the location where the items may be obtained at, a privacy level of the task/items, any potential funds or credits required for obtaining the items, any limitations (e.g., age, identification card, etc.) in obtaining the items, any potential time requirement to deliver the items to the user, and the like.

In various scenarios, a service provider may determine a plurality of potential contacts for assisting with one or more tasks by analyzing the task criteria and the current and/or future data associated with the contacts.

In one embodiment, if a task includes a deadline for completion, a service provider may determine a probability distribution for a user requesting assistance with the task to be at/near the same location as any of the contacts in the user's social network before the deadline, wherein the service provider may select only those contacts. In one embodiment, the service provider may determine various lists of potential contacts based on the probability distribution.

In one embodiment, the service provider may first present a pending task to those contacts who may be at a location where they can fulfill the requested task. For example, a contact currently is at a store where he can obtain an item as requested by the user.

In one scenario, a user A submits a request for a few ink cartridges for his printer at home. Further, a user B, an office-mate of the user A, is currently shopping for a few items at an office-supply store before going to the office. Furthermore, a service provider may process user A's request, determine that user B is a contact and an office-mate of the user A, and determine a probability that the two users may most likely meet at the office during the day. Additionally, the service provider may cause the user A request to be presented to the user B since user B could potentially fulfill the request and deliver the ink cartridges to the user A when they meet at the office. In one example, the user B may receive a message/notification indicating that "user A needs a few ink cartridges today. Can you help?" In one scenario, the user B may accept or reject via one or more messages (e.g., SMS, via an application, etc.) to the service provider. In the case where the user B accepts to fulfill the request, the service provider may analyze possible schedule information (e.g., personal calendars, social networking calendars, etc.) of the two users and suggest a meeting time so that the user B could deliver the ink cartridges to user A and user A may make payment to user B for the cartridges. However, in the case where the user B refuses or ignores the message for a predetermined duration of time, then the task may remain pending until another potential contact accepts to fulfill the request.

In various embodiments, a service provider may purge an accepted task from a list of tasks so that other contacts my not inadvertently fulfill the task. Alternatively, the request may be allowed to expire after a predetermined duration of time after its submission by a requesting user. In one embodiment, after a task has been accepted by a contact, any subsequent acceptance offers from other contacts may receive a negative acknowledgement from the service provider and/or the requesting user, where communication network traffic and updates to all potential contacts may be reduced. In one embodiment, the users may choose to update the service provider once the task has been fulfilled and completed.

In one embodiment, a user may cause a transfer of any funds/credits (e.g., cyber currency) for any requested items/services to a service provider that may be coordinating the request, to a contact who has accepted/completed the request, to a vendor identified by the contact, and the like.

In one embodiment, a request may include a plurality of tasks where a service provider may process and determine to present one or more tasks to a plurality of contacts. For example, a request may include several tasks to purchase several items for a user. In one scenario, the items may be available at one vendor location (e.g., super store) where the request may be presented as a single request with multiple tasks, which a single contact may accept. In another scenario, the requested items may need to be obtained at different vendor locations (e.g., not available in a single store location), wherein, for better efficiency, the service provider may create and present several sub-requests to a plurality of contacts so that the contacts may choose to accept one or more of the sub-requests.

As shown in FIG. 1, in one embodiment, the system 100 includes user equipment (UE) 101a-101n (also collectively referred to as a UE 101 and/or UEs 101), which may be utilized to execute one or more applications 103a-103n (also collectively referred to as applications 103) including navigation application, security applications, games, social networking, web browser, media application, user interface (UI), map application, web client, etc. to communicate with other UEs 101, one or more service providers 105a-105n (also collectively referred to as service provider/providers 105), a processing platform 107, one or more satellites 111a-111n (also collectively referred to as the satellite system 111), and/or with other components of a the system 100 directly and/or over a communication network 113. In one embodiment, the UEs 101 may include data collection modules 115a-115n (also collectively referred to as DC module 115) for determining and/or collecting data associated with the UEs 101, one or more sensors of the UE 101, one or more users of the UEs 101, applications 103, one or more content items, and the like.

In one embodiment, the UEs 101 may include task clients 121a-121n (also collectively referred to as a task client 121) for submitting and/or receiving a task request to and/or from the service providers 105, the processing platform 107, and the like. For example, a user may utilize a UE 101 to submit a task request to the service provider 105, the processing platform 107, and the like. In one example, a user may receive a task request from the service provider 105, the processing platform 107, and the like. In one embodiment, the task client 121 may utilize one or more algorithms, applications, software programs, and the like to associate various criteria with a request from a user of the UE 101. For example, the task client 121 may present a user interface (UI) to a user for detecting one or more user inputs. In various embodiments, the task client 121 may determine one or more executable commands based on one or more user inputs, wherein the commands may be associated with determining and transferring various request criteria, user authorization, and the like. In one embodiment, the task client 121 may be configured to determine information from various social networking accounts associated with one or more user accounts. In one embodiment, the task client 123 may be configured to submit one or more user request tasks to one or more service providers, one or more processing platforms, and the like.

In one embodiment, the service providers 105 may include and/or have access to one or more databases 117a-117n (also collectively referred to as database 117), which may include various mapping data, user information, user profiles, user preferences, one or more profiles of one or more user devices (e.g., device configuration, sensors information, etc.), information on the service providers 105, and the like. In one embodiment, the service providers 105 may include one or more service providers offering one or more services, for example, location based services, online shopping, social networking services (e.g., blogging), content sharing, media upload, media download, media streaming, account management services, or a combination thereof. Further, the service providers 105 may conduct a search for content items, media items, information, product and/or service information, and the like associated with one or more users, content items, POIs, geo-locations, and the like.

In one embodiment, the processing platform 107 may include and/or have access to one or more database 119a-119n (also collectively referred to as database 119), which may store, include, and/or have access to various data, for example, from different sources and/or different time periods, user information, user profiles, various vendors, various products, various services, device information, contents, service provider information, and the like. In one embodiment, one or more portions of the processing platform 107 may be implemented in a UE 101, at a computer, at a server, and the like. In various embodiments, the processing platform 107 may be configured to operate partially or completely as a stand-alone entity or as part of a service provider 105. In one embodiment, the processing platform 107 may utilize various programs or algorithms for processing and analyzing various requests, request criteria, location information, contextual data, and the like parameters associated with a user, a user device, and the like. By way of example, the processing platform 107 may be operable for direct execution by a device, i.e., a UE 101. Under this approach, the processing platform 107 may be implemented as a software executable, hardware executable, or a combination thereof. Alternatively, the processing platform 107 may be accessed via a communication network 113 as a service or a platform. In either implementation, the processing platform 107 is configured to, at least, facilitate processing and analysis of requests associated with a user, a user device, and the like. In various embodiments, the processing platform 107 may be maintained on a network server and include a web-service, an applet, a script, an object-oriented application, and the like while operating in connection with one or more sensors and/or devices in a user environment. In one embodiment, the processing platform 107 may process contextual information associated with a request presented by a user and/or a user device. In various embodiments, the processing platform 107 may determine various information associated with various contacts associated with a user, wherein the information may be determined from the contacts' user devices, social networking site postings/messages/updates, and the like. In one embodiment, the processing platform 107 may determine a plurality of responses from one or more contacts in response to one or more task requests from one or more users, wherein the processing platform 107 may process and coordinate the one or more responses.

In one embodiment, the system 100 determines one or more contextual criteria for at least one task associated with at least one user. In one embodiment, the processing platform 107 may receive a request (e.g., a message) from a user indicating that the user wishes to receive assistance from other users on one or more tasks. In one embodiment, the processing platform 107 may determine various information items from the contextual criteria, for example, location of the user, time for completion of the one or more tasks, type of tasks, privacy level of the tasks, location where the task may be performed at (e.g., a certain store), and the like. For example, the user request may indicate that the user would like someone (e.g., a friend, a contact at a social networking site, etc.) to buy a gallon of milk, pick-up a certain prescribed medication from a pharmacy, pick-up an item left behind at the office, etc. and deliver it to the user.

In one embodiment, the system 100 causes, at least in part, a selection of one or more contacts associated with the at least one user based, at least in part, on the one or more contextual criteria. In one embodiment, the processing platform 107 may determine one or more contacts (e.g., other users, friends, etc.) that may be able to assist with the requested tasks. In one embodiment, the one or more contacts are associated with one or more social networks of the at least one user. For example, the one or more contacts may share one or more social network connections with the user via one or more social networking sites. In one embodiment, the processing platform 107 may determine the one or more contacts from one or more contact lists associated with the user, wherein the contacts lists may be available at a device associated with the user, or may be available via one or more user accounts at one or more service providers or social networking sites, and the like. In one instance, a contact may be at a geo-location where the task may be performed.

In one embodiment, the system 100 causes, at least in part, a presentation of the at least one task to the one or more contacts. In various embodiments, the processing platform 107 may present the one or more tasks to the one or more contacts via one or more service providers, one or more social networking sites, one or more messages, one or more network links, and the like. For example, the processing platform 107 may cause an SMS message to be sent to one or more contacts who may meet the criteria for assisting with the task indicated by the user. In one example, the presentation may be via a posting at a contact's social networking site account/link.

In one embodiment, the system 100 processes and/or facilitates a processing of one or more contextual histories of the one or more contacts to determine a probability that the one or more contacts at least substantially meet the one or more contextual criteria, wherein the selection of the one or more contacts is further based, at least in part, on the probability. In one embodiment, the one or more contextual histories include a location history, an activity history, a social messaging history, or a combination thereof. For example, the processing platform 107 may process and analyze location information of a contact, for instance at a social networking site, to determine a probability that the contact may currently be at or near a location where the contact would be able to assist with the requested task. In one embodiment, the contextual criteria may be analyzed to determine if the criteria for a requested task may be met in the near future. For example, the processing platform 107 may determine that a contact is located near a library where the contact may be able to assist with a request from a user to pick-up a book at the library check-out desk.

In one embodiment, the system 100 determines one or more current contexts of the one or more contacts, wherein the selection of the one or more contacts is further based, at least in part, on an application of the one or more contextual criteria against the one or more current contexts. In one embodiment, a current location of a contact may be compared to a location of a task that is requested by a user. For example, a user may have asked for a contact (e.g., a co-worker) to retrieve a laptop computer that the user has left behind at the user's office, wherein a current location of a certain contact and the location of the office may be compared to determine if that certain contact may potentially be able to assist with the request of retrieving the laptop computer.

In one embodiment, the system 100 determines that at least one of the one or more contacts has accepted the at least one task. In one embodiment, the processing platform 107 may receive and process one or more messages/replies from one or more contacts who may wish to accept and assist with the task requested by a user. In one embodiment, the processing platform 107 may determine an acceptance from one or more contacts via one or more social networking sites, for example, via a posting at the social networking site. In one example, a contact may utilize one or more applications on a user device to indicate an acceptance of a task.

In one embodiment, the system 100 causes, at least in part, a purging of the presentation of the at least one task from other one or more of the one or more contacts that have not accepted the at least one task. In one embodiment, the processing platform 107 may determine that a contact has accepted to complete a task for a user, wherein the processing platform 107 may remove the accepted task from a list at the processing platform 107, at a service provider 105, at a list maintained at a device of a contact, and the like. In one embodiment, the processing platform 107 may cause a message to be sent to the one or more contacts indicating that a particular task has been accepted for completion, wherein user devices of the one or more contact may note and remove the task from a list associated with the user devices. In one embodiment, the processing platform 107 may remove a network link (e.g., a hyperlink) from a service provider site, from a social networking site, and the like.

In one embodiment, the system 100 determines that the first one of the one or more contacts has not accepted the at least one task or has not accepted the at least one task within a predetermined time. In one embodiment, the processing platform 107 may determine a plurality of potential contacts who may meet the contextual criteria of a certain task, wherein the processing platform 107 may present the task to the first contact of the plurality of contacts. Further, the processing platform 107 may request for a response from the first contact to indicate an acceptance or a decline. In one embodiment, the processing platform 107 may allow for a predetermined duration of time for the first contact to respond after which, the processing platform 107 may determine that the first contact is declining the task or was not able to respond within the predetermined duration of time.

In one embodiment, the system 100 causes, at least in part, a presentation of the at least one task to a second one of the one or more contacts. In one embodiment, the processing platform 107 may determine that the first contact among a plurality of contacts has not accepted a task and may present the task to a second contact among the plurality of contacts. In one embodiment, the processing platform 107 may substantially simultaneously present the task to a plurality of contacts. For example, the processing platform 107 may present a task to all determined contacts who may be potentially able to assist with the task.

In one embodiment, the system 100 determines that at least one of the one or more contacts has accepted the at least one task. In one embodiment, the processing platform 107 may request or receive a response from one or more contacts indicative of an acceptance. In one embodiment, the processing platform 107 may receive a plurality of acceptances from a plurality of contacts, wherein the processing platform 107 and/or the user requesting assistance with a task may determine which contact may be best suited for completing the task. For example, the processing platform 107 may utilize the one or more contextual criteria of the task and the current contextual information of the contacts to determine that the location of a certain contact may be closest to the location where the task may need to be completed at. In one example, two contacts may accept to purchase an ink cartridge from a local office supply store and deliver to the user, wherein one of the contacts may be nearest to the office supply store and the processing platform 107 may indicate to the contact closest to the store that that contact is chosen to complete the task.

In one embodiment, the system 100 determines a meeting schedule for the at least one user and the at least one of the one or more contacts. In one embodiment, the processing platform 107 may access scheduling information associated with the contact who has accepted to complete a task and scheduling information of the requesting user, wherein the scheduling information may be determined from the contextual criteria of the task and the acceptance response from the contact completing the task. For example, a user may request for a contact to procure and deliver a certain item at a predetermined time and location, wherein an acceptance response from the contact may indicate an agreement or a proposal for a different time and/or location. In one embodiment, the processing platform 107 may determine a meeting schedule based on scheduling information associated with a device, a social networking calendar, a personal calendar, and the like associated with the user and the contact. For example, the personal calendars of the user and the contact may indicate that the user and the contact may be meeting tomorrow for a lunch appointment where the contact may deliver to the user an item that was the task or was part of the task requested by the user.

In one embodiment, the system 100 determines that at least one of the one or more contacts has completed the at least one task. In one embodiment, the processing platform 107 may receive an indicator message/response from a contact indicating the contact has completed a task requested by a user. In one embodiment, the processing platform 107 may determine a completion of the task via one or more social networking sites, one or more service providers, and the like. In one example, the contact may utilize an application on a user device to indicate the completion directly to the processing platform 107.

In one embodiment, the system 100 causes, at least in part, an updating of status information for the at least one task. In one embodiment, the processing platform 107 may update the status information of the task on a list, at a service provider site, at a social networking site, via a network link associated with the processing platform 107, and the like.

In one embodiment, the system 100 causes, at least in part, a presentation of the status information to the at least one user. In one embodiment, the processing platform 107 may cause sending of one or more messages to the user, wherein one or more information items associated with the status of the requested tasks may be presented to the user. In one embodiment, the status update may include one more information items associated with the contact completing a requested task, scheduling information for meeting with the contact for delivery/receipt of any possible physical items associated with the requested task, and the like.

In one embodiment, the system 100 causes, at least in part, a presentation of the one or more contacts for selection by the at least one user. In one embodiment, the processing platform 107 may determine and present to the user one or more potential contacts who may be able to assist with a task that the user would like assistance with so that the user may review and select one or more contacts from the list of potential contacts for the processing platform 107 to utilize as potential contacts for completing the task. For example, the user may wish to select only close contacts (e.g., friends) for performing certain tasks, which may require privacy. In one embodiment, contact information of contacts associated with a user may indicate as to what types of tasks a contact may be asked to assist with. For example, an office manager may be listed as a contact at a user's social networking site, but the user may not wish to request the manager to assist with picking up a personal prescription medication from a local pharmacy.

In one embodiment, the system 100 determines an input from the at least one user for selecting at least one of the one or more contacts for completing the at least one task. In one embodiment, a user may indicate/select a plurality of contacts from a list of contacts; for example, at a user device, at one or more social networking sites, etc., which the user may wish to include or exclude from use by the processing platform 107 for coordinating a task requested by the user. For example, the contact information may indicate that the contact may only be utilized for general tasks that do not indicate any privacy requirements. In one embodiment, the contact information may be associated with a contact profile at a social networking site.

In various embodiments, the UE 101 may include one or more location modules/sensors that can determine the UE 101 location (e.g., a user/vehicle indoor/outdoor location). The location information can be determined by a triangulation system such as a GPS, assisted GPS (A-GPS), Cell of Origin, wireless local area network triangulation, or other location extrapolation technologies. Standard GPS and A-GPS systems can use the one or more satellites 111 to pinpoint the location (e.g., longitude, latitude, and altitude) of the UE 101. A Cell of Origin system can be used to determine the cellular tower that a cellular device (e.g., a UE 101) is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., WLAN) connection to determine the UE 101 location information, for example, from an Internet source (e.g., a service provider). It is also contemplated that one or more AR, VR, and/or MR applications may be used to render a virtual presentation associated with one or more users.

By way of example, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, TV receiver, radio broadcast receiver, electronic book device, game device, or any combination thereof, including the accessories and peripherals of these devices, or any combination thereof. It is also contemplated that the UEs can support any type of interface to the user (such as "wearable" circuitry, etc.). Further, the UEs 101 may include various sensors for collecting data associated with a vehicle, a user, a user's environment, and/or with a UE 101, for example, the sensors may determine and/or capture audio, video, images, atmospheric conditions, device location, user mood, ambient lighting, user physiological information, device movement speed and direction, and the like.

By way of example, the UEs 101, the service provider 105, and the processing platform 107 may communicate with each other and the other components of the system 100 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, one or more entities of the system 100 may interact according to a client-server model with the applications 103 and/or the DC module 115 of the UE 101. According to the client-server model, a client process sends a message including a request to a server process, and the server process responds by providing a service (e.g., context-based grouping, social networking, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
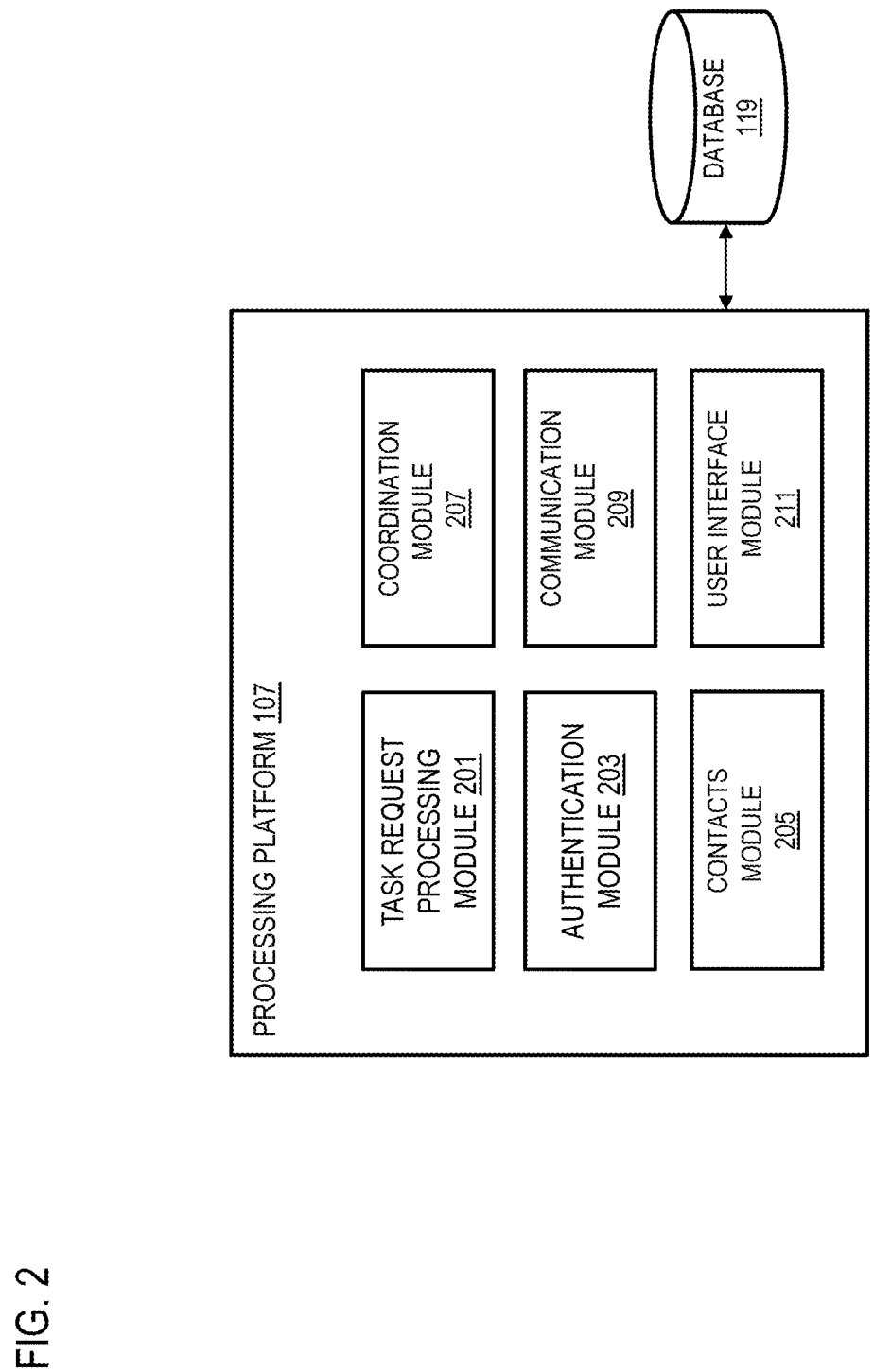
FIG. 2 is a diagram of the components of a processing platform, according to an embodiment.

FIG. 2 is a diagram of the components of a processing platform, according to an embodiment. By way of example, the processing platform 107 includes one or more components for efficiently coordinating one or more tasks among a plurality of users. As previously noted, one or more portions of the processing platform 107 may be implemented at a service provider 105, as a standalone element of the system 100, in a UE 101, and the like. It is contemplated that the functions of these components may be combined in one or more components or performed by other components of equivalent functionality. In one embodiment, the processing platform 107 includes task request processing module 201, an authentication module 203, a contacts module 205, a coordination module 207, a communication module 209, and a user interface module 211.

In one embodiment, the task request processing module 201 may be utilized in receiving and processing a task request for determining contextual information associated with the task request. Further, the task request processing module 201 may operate in conjunction with the authentication module 203 to verify that a given task request is by an authorized user. For example, the authentication module 203 may determine the user login information and password associated with one or more user accounts. For instance, a user account may be at the processing module, at a service provider, at one or more social networking sites, at one or more financial cyber accounts, and the like. In various embodiments, the contextual information may include information on what is requested (e.g., an item, a service, etc.), when is the request to be fulfilled, location information of the user, location where the task may be completed at (e.g., a store), if a meeting is required to complete the task (e.g., deliver an item to the user).

In one embodiment, an authentication module 203 authenticates users and UEs 101 for interaction with the task request processing module 201, one or more UEs 101, one or more service providers, a service provider 105, and the like. In one embodiment, the authentication module 203 may operate in connection with the user interface module 211 for causing rendering of a user interface for receiving user input for presenting, requesting, and/or receiving user information for authenticating the user task request. In addition, the authentication module 203 may enable the establishing of various user profiles, user information, account information, and the like. The authentication module 203 and the profile data may also facilitate one or more rights and permissions for permitting access to various user data.

In one embodiment, the contacts module 205 may operate in connection with the task request processing module 201 to determine information of the user requesting the task so that one or more potential contacts for fulfilling the requested task may be determined. In various embodiments, the one or more potential contacts may be determined from one or more social networking sites associated with the user, one or more user accounts at one or more service providers, one or more user devices, one or more storage devices (e.g., remote, local, cloud computing, etc.), and the like. In various embodiments, the potential contacts may be determined from one or more user profiles, user history, user preferences, and the like.

In one embodiment, the coordination module 207 can operate in connection with the task request processing module to determine task information, user location, task fulfillment location, and the like. In one embodiment, the coordination module 207 may receive, from the contacts module 205, information on one or more potential contacts for determining further information associated with the potential contacts. In various embodiments, the coordination module 207 may determine contact information, for example, location, status on one or more social networking sites, relation to the user, current and near-future locations, activity, contact history associated with the user, and the like. In one embodiment, the contact information may be determined from and/or shared with the applications 103, the DC module 115, the service provider 105, and/or the other entities of the system 100 via the communication module 209. Further, the coordination module 207 may manage (e.g., organizes) the collected user, task, and/or contact data by utilizing various rules, logic, algorithms, instructions, etc. In one embodiment, the coordination module 207 may organize, coordinate, and/or present one or more task requests to one or more contacts via the communication module 209. For example, one or more task requests may be presented via the communication module 209 to one or more contacts via one or more direct messages to the one or more contacts, or the task requests may be posted/listed on one or more social networking sites associated with the one or more contacts. In one embodiment, the coordination module 207 may receive, organize, and coordinate one or more responses from one or more contacts. In one embodiment, the coordination module 207 may determine one or more meeting schedules for a user requesting a task and one or more contacts who may be fulfilling the requested task. For example, the coordination module 207 may coordinate for a contact to buy an item for a user and then schedule/suggest a time for the user and the contact to meet so the contact can deliver the item to the user. In one embodiment, the coordination module 207 may track the progress of one or more task requests on one or more lists, social networking sites, and the like so that status of a given task may be determined and updated until the task is completed, cancelled, suspended, purged, and the like.

In one embodiment, a communication module 209 enables communication between the processing platform 107, the UEs 101, the service providers 105, and other components of the system 100 via one or more proximity-based communication channels (e.g., Bluetooth®, WLAN, etc.) local area network, and/or via a network based (e.g., cellular) session over the communication network 113. By way of example, the communication module 209 executes various protocols and data sharing techniques for enabling collaborative execution among the system 100 components via the communication network 113.

In one embodiment, the user interface module 211 enables presentation of a graphical user interface for facilitating user input of various information and parameters associated with one or more task requests. By way of example, the user interface module 211 generates the interface in response to application programming interfaces (APIs) or other function calls corresponding to applications, data, parameters, commands, and the like associated with a UE 101, the processing platform 107, and/or other components of the system 100. In one embodiment, the UI 211 may utilize various UI technologies available on a UE 101 for interfacing with the user. For example, a touch sensitive display, a detection field (e.g., capacitive, electromagnetic, etc.), audio/video input, and the like. It is noted that the user interface module 211 may operate in accordance with various operating system environments for supporting the rendering of one or more representations of various information, content, data, and the like.

Figure 3:
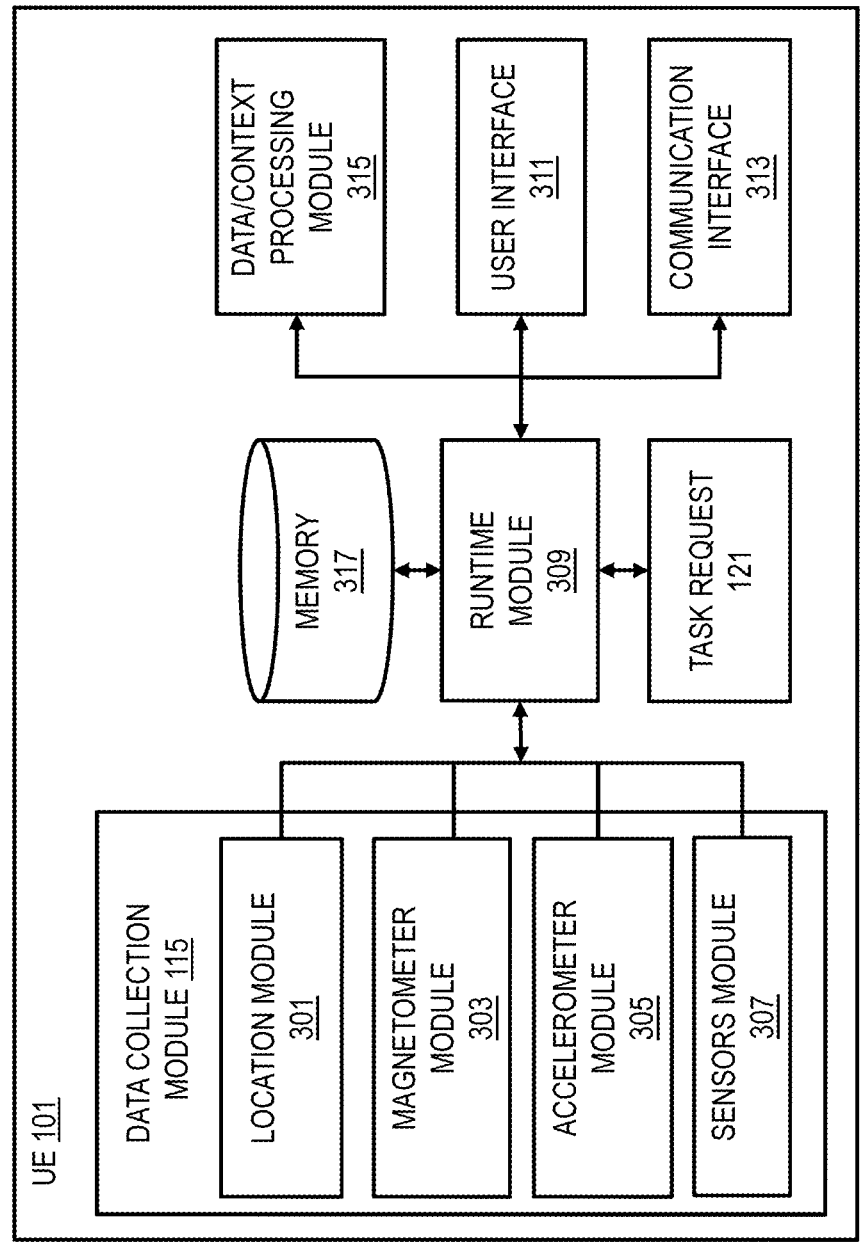
FIG. 3 is a diagram of the components of a user equipment capable efficiently coordinating one or more tasks among a plurality of users, according to an embodiment.

FIG. 3 is a diagram of the components of a user equipment utilized in efficiently coordinating one or more tasks among a plurality of users, according to an embodiment. By way of example, a UE 101 includes one or more components for submitting and receiving information associated with one or more task requests. It is contemplated that the functions of these components may be combined in one or more components or performed by other components of equivalent functionality. In this embodiment, the UE 101 includes a data collection module 115 that may include one or more location modules 301, magnetometer modules 303, accelerometer modules 305, and sensors modules 307. Further, the UE 101 may also include a runtime module 309 to coordinate the use of other components of the UE 101, a user interface 311, a communication interface 313, a data/context processing module 315, a memory 317, and a task client 121. The applications 103 of the UE 101 can also execute on the runtime module 309 utilizing the components of the UE 101.

The location module 301 can determine a user's location, for example, via location of a UE 101. The user's location can be determined by a triangulation system such as GPS, assisted GPS (A-GPS), Cell of Origin, or other location extrapolation technologies. Standard GPS and A-GPS systems can use satellites 111 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 301 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory 317 and are available to the processing platform 107, the service provider 105, and/or to other entities of the system 100 via the communication interface 313. Moreover, in certain embodiments, the GPS coordinates can include an altitude to provide a height. In other embodiments, the altitude can be determined using another type of altimeter. In certain embodiments, the location module 301 can be a means for determining a location of the UE 101, an image, or used to associate an object in view with a location.

The magnetometer module 303 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory 317, made available to other modules and/or applications 103 of the UE 101, and/or transmitted via the communication interface 313 to one or more entities of the system 100.

The accelerometer module 305 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 305 can determine the angle the UE 101 is pointed as compared to Earth's gravity. In certain embodiments, the magnetometer module 303 and accelerometer module 305 can be means for ascertaining a perspective of a user. This perspective information may be stored in the memory 317, made available to other modules and/or applications 103 of the UE 101, and/or sent to one or more entities of the system 100.

In various embodiments, the sensors module 307 may include various sensors for detecting and/or capturing data associated with the user and/or the UE 101. For example, the sensors module 307 may include sensors for capturing environmental (e.g., atmospheric) conditions, audio, video, images, location information, temperature, user physiological data, user mood (e.g., hungry, angry, tired, etc.), user interactions with the UEs 101, and the like. In certain embodiments, information collected from and/or by the data collection module 115 can be retrieved by the runtime module 309, stored in memory 317, made available to other modules and/or applications 103 of the UE 101, and/or sent to one or more entities of the system 100.

The UI 311 can include various methods of communication. For example, the user interface 311 can have outputs including a visual component (e.g., a screen), an audio component, a physical component (e.g., vibrations), and other methods of communication. User interface can include a touch-screen interface, a detecting/sensitivity-field around one or more sides, a scroll-and-click interface, a button interface, a microphone, etc. Input can be via one or more methods such as voice input, textual input, typed input, typed touch-screen input, other touch-enabled input, etc.

In one embodiment, the communication interface 313 can be used to communicate with one or more entities of the system 100. Certain communications can be via methods such as an internet protocol, messaging (e.g., SMS, MMS, etc.), Bluetooth®, NFC, IR, or any other communication method directly among the UEs 101 and/or via the communication network 113. In some examples, the UE 101 can transfer contents associated with a UE 101 to one or more other UEs 101 and/or components of the system 100.

The data/context processing module 315 may be utilized in determining context information from the data collection module 115 and/or applications 103 executing on the runtime module 309. For example, it can determine user activity, content consumption, application and/or service utilization, user information, type of information included in the data, information that may be inferred from the data, and the like. The data may be shared with the applications 103, and/or caused to be transmitted, via the communication interface 313, to the service provider 105 and/or to other entities of the system 100. The data/context processing module 315 may additionally be utilized as a means for determining information related to the user, various data, the UEs 101, and the like. Further, data/context processing module 315, for instance, may manage (e.g., organizes) the collected data based on general characteristics, rules, logic, algorithms, instructions, etc. associated with the data. In certain embodiments, the data/context processing module 315 can infer higher level context information from the context data such as favorite contents, significant places, common activities, interests in products and services, etc.

In various embodiments, the task client 121 may interact with one or more modules, components, elements, etc. of the UE 101 for performing one or more processes in creating, submitting, receiving, and/or responding to one or more task requests. For example, a user may interact with a task client on a UE 101 to create and submit a task request to a processing platform 107. In one example, a user/contact may interact with a task client on a UE 101 to receive, view, browse one or more task requests and respond to a processing platform 107 and indicate an acceptance and/or a rejection of a task request. Still, a contact may view one or more task requests without taking an action (e.g., ignore the requests.)

Figure 4:
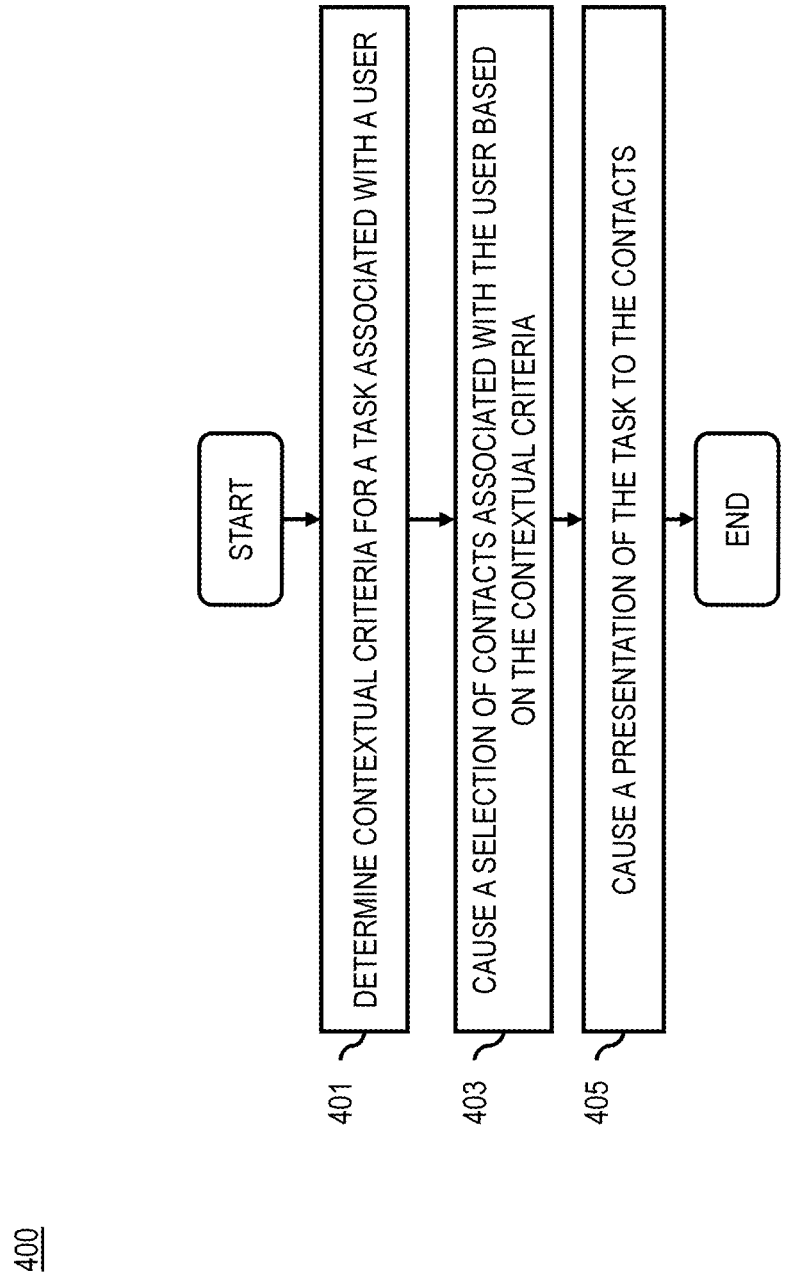
Figure 10:
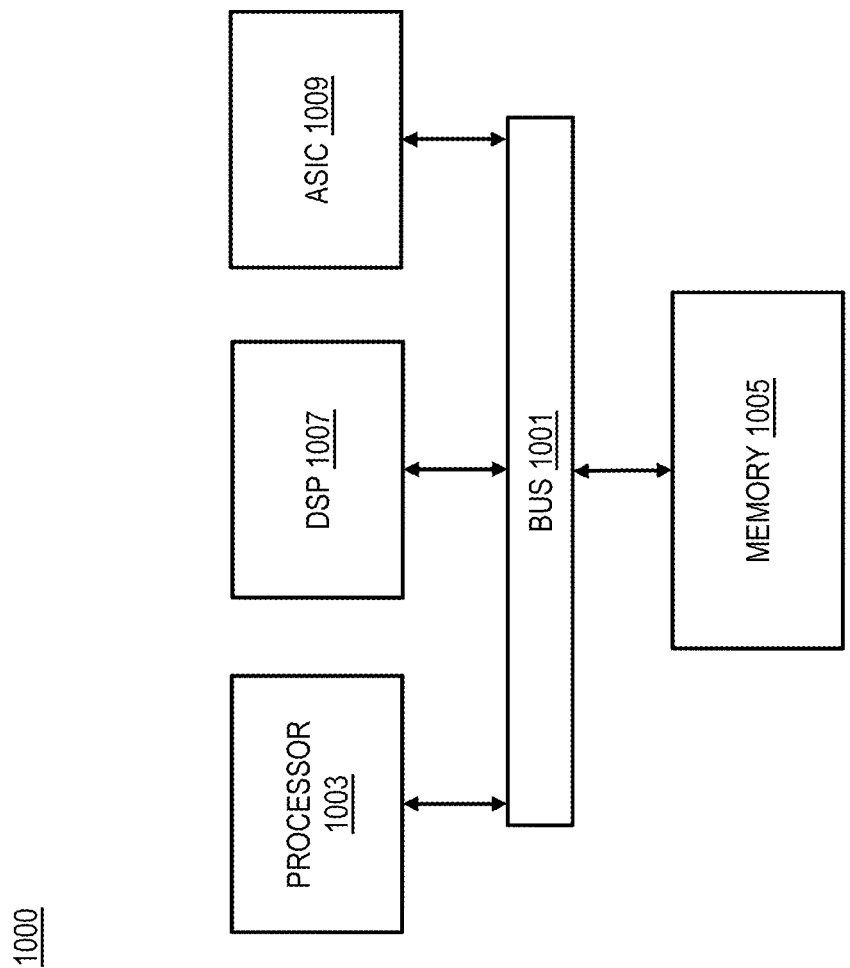
FIG. 10 is a diagram of a chip set that can be used to implement an embodiment of the invention.

FIGS. 4 through 6 illustrate flowcharts of various processes for, at least, efficiently coordinating one or more tasks among a plurality of users, according to various embodiments. In various embodiments, the processing platform 107 and/or a UE 101 may perform one or more portions of the processes 400, 500, and 600, which may be implemented in, for instance, a chip set including a processor and a memory as shown in FIG. 10. As such, the processing platform 107 and/or a UE 101 can provide means for accomplishing various parts of the process 400, 500, and 600 as well as means for accomplishing other processes in conjunction with other components of the system 100. Throughout these processes, the processing platform 107 and/or a UE 101 may be referred to as completing various portions of the processes 400, 500, and 600, however, it is understood that other components of the system 100 can perform some and/or all of the process steps. Further, for clarity in discussing the 400, 500, and 600 processes, the processing platform 107 is referred to as completing various steps of said processes.

In step 401 of the FIG. 4, a processing platform 107 may determine one or more contextual criteria for at least one task associated with at least one user. In one embodiment, the processing platform 107 may receive a request (e.g., a message) from a user indicating that the user wishes to receive assistance from other users on one or more tasks. In one embodiment, the processing platform 107 may determine various information items from the contextual criteria, for example, location of the user, time for completion of the one or more tasks, type of tasks, privacy level of the tasks, location where the task may be performed at (e.g., a certain store), and the like. For example, the user request may indicate that the user would like someone (e.g., a friend, a contact at a social networking site, etc.) to buy a gallon of milk, pick-up a certain prescribed medication from a pharmacy, pick-up an item left behind at the office, etc. and deliver it to the user.

In step 403, the processing platform 107 may cause, at least in part, a selection of one or more contacts associated with the at least one user based, at least in part, on the one or more contextual criteria. In one embodiment, the processing platform 107 may determine one or more contacts (e.g., other users, friends, etc.) that may be able to assist with the requested tasks. In one embodiment, the one or more contacts are associated with one or more social networks of the at least one user. For example, the one or more contacts may share one or more social network connections with the user via one or more social networking sites. In one embodiment, the processing platform 107 may determine the one or more contacts from one or more contact lists associated with the user, wherein the contacts lists may be available at a device associated with the user, or may be available via one or more user accounts at one or more service providers or social networking sites, and the like. In one instance, a contact may be at a geo-location where the task may be performed.

In step 405, the processing platform 107 may cause, at least in part, a presentation of the at least one task to the one or more contacts. In various embodiments, the processing platform 107 may present the one or more tasks to the one or more contacts via one or more service providers, one or more social networking sites, one or more messages, one or more network links, and the like. For example, the processing platform 107 may cause an SMS message to be sent to one or more contacts who may meet the criteria for assisting with the task indicated by the user. In one example, the presentation may be via a posting at a contact's social networking site account/link.

In step 501 of the FIG. 5, the processing platform 107 may process and/or facilitate a processing of one or more contextual histories of the one or more contacts to determine a probability that the one or more contacts at least substantially meet the one or more contextual criteria, wherein the selection of the one or more contacts is further based, at least in part, on the probability. In one embodiment, the one or more contextual histories include a location history, an activity history, a social messaging history, or a combination thereof. For example, the processing platform 107 may process and analyze location information of a contact, for instance at a social networking site, to determine a probability that the contact may currently be at or near a location where the contact would be able to assist with the requested task. In one embodiment, the contextual criteria may be analyzed to determine if the criteria for a requested task may be met in the near future. For example, the processing platform 107 may determine that a contact is located near a library where the contact may be able to assist with a request from a user to pick-up a book at the library check-out desk.

In step 503, the processing platform 107 may determine one or more current contexts of the one or more contacts, wherein the selection of the one or more contacts is further based, at least in part, on an application of the one or more contextual criteria against the one or more current contexts. In one embodiment, a current location of a contact may be compared to a location of a task that is requested by a user. For example, a user may have asked for a contact (e.g., a co-worker) to retrieve a laptop computer that the user has left behind at the user's office, wherein a current location of a certain contact and the location of the office may be compared to determine if that certain contact may potentially be able to assist with the request of retrieving the laptop computer.

In step 505, the processing platform 107 may determine that at least one of the one or more contacts has accepted the at least one task. In one embodiment, the processing platform 107 may receive and process one or more messages/replies from one or more contacts who may wish to accept and assist with the task requested by a user. In one embodiment, the processing platform 107 may determine an acceptance from one or more contacts via one or more social networking sites, for example, via a posting at the social networking site. In one example, a contact may utilize one or more applications on a user device to indicate an acceptance of a task.

In step 507, the processing platform 107 may cause, at least in part, a purging of the presentation of the at least one task from other one or more of the one or more contacts that have not accepted the at least one task. In one embodiment, the processing platform 107 may determine that a contact has accepted to complete a task for a user, wherein the processing platform 107 may remove the accepted task from a list at the processing platform 107, at a service provider 105, at a list maintained at a device of a contact, and the like. In one embodiment, the processing platform 107 may cause a message to be sent to the one or more contacts indicating that a particular task has been accepted for completion, wherein user devices of the one or more contact may note and remove the task from a list associated with the user devices. In one embodiment, the processing platform 107 may remove a network link (e.g., a hyperlink) from a service provider site, from a social networking site, and the like.

In step 509, the processing platform 107 may determine that the first one of the one or more contacts has not accepted the at least one task or has not accepted the at least one task within a predetermined time. In one embodiment, the processing platform 107 may determine a plurality of potential contacts who may meet the contextual criteria of a certain task, wherein the processing platform 107 may present the task to the first contact of the plurality of contacts. Further, the processing platform 107 may request for a response from the first contact to indicate an acceptance or a decline. In one embodiment, the processing platform 107 may allow for a predetermined duration of time for the first contact to respond after which, the processing platform 107 may determine that the first contact is declining the task or was not able to respond within the predetermined duration of time.

In step 511, the processing platform 107 may cause, at least in part, a presentation of the at least one task to a second one of the one or more contacts. In one embodiment, the processing platform 107 may determine that the first contact among a plurality of contacts has not accepted a task and may present the task to a second contact among the plurality of contacts. In one embodiment, the processing platform 107 may substantially simultaneously present the task to a plurality of contacts. For example, the processing platform 107 may present a task to all determined contacts who may be potentially able to assist with the task.

In step 601 of the FIG. 6, the processing platform 107 may determine that at least one of the one or more contacts has accepted the at least one task. In one embodiment, the processing platform 107 may request or receive a response from one or more contacts indicative of an acceptance. In one embodiment, the processing platform 107 may receive a plurality of acceptances from a plurality of contacts, wherein the processing platform 107 and/or the user requesting assistance with a task may determine which contact may be best suited for completing the task. For example, the processing platform 107 may utilize the one or more contextual criteria of the task and the current contextual information of the contacts to determine that the location of a certain contact may be closest to the location where the task may need to be completed at. In one example, two contacts may accept to purchase an ink cartridge from a local office supply store and deliver to the user, wherein one of the contacts may be nearest to the office supply store and the processing platform 107 may indicate to the contact closest to the store that that contact is chosen to complete the task.

In step 603, the processing platform 107 may determine a meeting schedule for the at least one user and the at least one of the one or more contacts. In one embodiment, the processing platform 107 may access scheduling information associated with the contact who has accepted to complete a task and scheduling information of the requesting user, wherein the scheduling information may be determined from the contextual criteria of the task and the acceptance response from the contact completing the task. For example, a user may request for a contact to procure and deliver a certain item at a predetermined time and location, wherein an acceptance response from the contact may indicate an agreement or a proposal for a different time and/or location. In one embodiment, the processing platform 107 may determine a meeting schedule based on scheduling information associated with a device, a social networking calendar, a personal calendar, and the like associated with the user and the contact. For example, the personal calendars of the user and the contact may indicate that the user and the contact may be meeting tomorrow for a lunch appointment where the contact may deliver to the user an item that was the task or was part of the task requested by the user.

In step 605, the processing platform 107 may determine that at least one of the one or more contacts has completed the at least one task. In one embodiment, the processing platform 107 may receive an indicator message/response from a contact indicating the contact has completed a task requested by a user. In one embodiment, the processing platform 107 may determine a completion of the task via one or more social networking sites, one or more service providers, and the like. In one example, the contact may utilize an application on a user device to indicate the completion directly to the processing platform 107.

In step 607, the processing platform 107 may cause, at least in part, an updating of status information for the at least one task. In one embodiment, the processing platform 107 may update the status information of the task on a list, at a service provider site, at a social networking site, via a network link associated with the processing platform 107, and the like.

In step 609, the processing platform 107 may cause, at least in part, a presentation of the status information to the at least one user. In one embodiment, the processing platform 107 may cause sending of one or more messages to the user, wherein one or more information items associated with the status of the requested tasks may be presented to the user. In one embodiment, the status update may include one more information items associated with the contact completing a requested task, scheduling information for meeting with the contact for delivery/receipt of any possible physical items associated with the requested task, and the like.

In step 611, the processing platform 107 may cause, at least in part, a presentation of the one or more contacts for selection by the at least one user. In one embodiment, the processing platform 107 may determine and present to the user one or more potential contacts who may be able to assist with a task that the user would like assistance with so that the user may review and select one or more contacts from the list of potential contacts for the processing platform 107 to utilize as potential contacts for completing the task. For example, the user may wish to select only close contacts (e.g., friends) for performing certain tasks, which may require privacy. In one embodiment, contact information of contacts associated with a user may indicate as to what types of tasks a contact may be asked to assist with. For example, an office manager may be listed as a contact at a user's social networking site, but the user may not wish to request the manager to assist with picking up a personal prescription medication from a local pharmacy.

In step 613, the processing platform 107 may determine an input from the at least one user for selecting at least one of the one or more contacts for completing the at least one task. In one embodiment, a user may indicate/select a plurality of contacts from a list of contacts; for example, at a user device, at one or more social networking sites, etc., which the user may wish to include or exclude from use by the processing platform 107 for coordinating a task requested by the user. For example, the contact information may indicate that the contact may only be utilized for general tasks that do not indicate any privacy requirements. In one embodiment, the contact information may be associated with a contact profile at a social networking site.

Figure 7A:
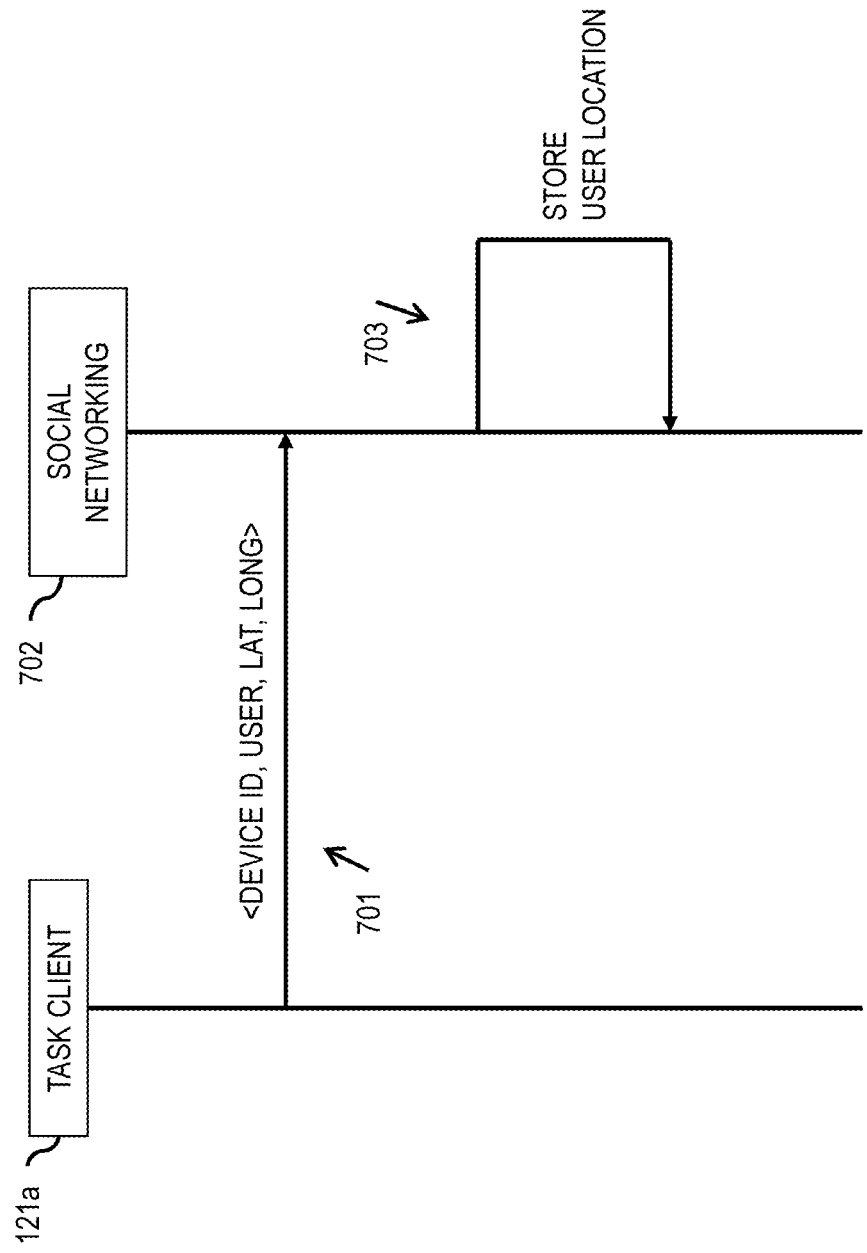

FIGS. 7A through 7G illustrate timing diagrams of example process steps for efficiently coordinating one or more tasks among a plurality of users, according to various embodiments. In FIG. 7A, a user may share data 701 with a social networking service 702 (e.g., a type of service provider 105), via a task client 121a of a UE 101 where the data 701 may include location information, device ID, user ID, and the like one or more other information, which in 703 may be stored at one or more social networking site servers. In various embodiments, the data 701 may be updated periodically and/or by the user of the UE 101. In one embodiment of FIG. 7B, a user 705 may generate a request 707 via a UI 709 at the task client 121. In one example, a request may include various information associated with the user location, user UE 101, time, data, type of task, privacy level, time/date to fulfill the task, and the like, which at 711 may then be submitted to the social networking service 702 for storing at 713 and/or at 715 submitted to the processing platform 107 for processing and analysis. As discussed above, the processing platform 107 partially or completely may be implemented at a service provider 105.

Figure 7C:
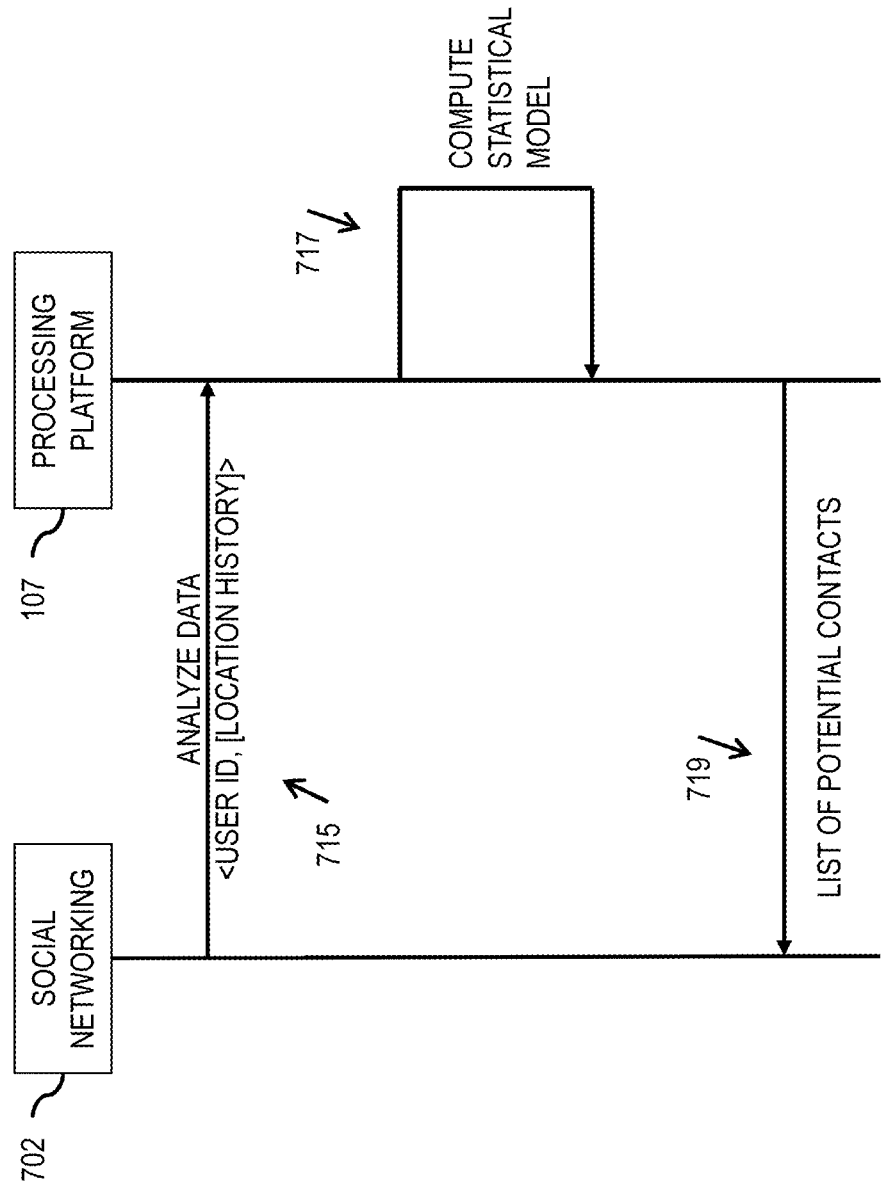

In FIG. 7C, the processing platform 107 may, at 717, process and analyze the submitted request 707, wherein contextual criteria associated with the request may be determined; for example, to determine what is the task in the request, is there a deadline, a privacy level of the task, location of the user, potential location where the task may be fulfilled, potential contacts associated with the user, and the like. In one embodiment, the processing platform 107 may further determine a list of one or more potential contacts 719 based, at least in part, on the contextual criteria, contacts determined from the user's social networking sites, user's contact information on the user UE 101, user history, and the like.

In FIG. 7D, the processing platform 107 may submit the list of one or more potential contacts 719 to one or more social networking services 702 and/or at 720 may directly present the request to 721a, a contact A, via one or more task clients 121b-121n. Alternatively, the social networking service 705 may present/post the request 723 to the task clients 121b-121n via direct messages to the UEs 101a-101n and/or postings to the social networking sites of the potential contacts in the 719 list. In one embodiment, a task client 121b may store a request 723 until the applications 103 and/or the DC module 115 of the UE 101b (of the task client 121b) determine that at 725 the UE 101b is near the location of the user and/or where the requested task 723 may be fulfilled, the request 723 may be presented to the contact A, at 727. In one scenario, the contact A may respond and accept the request at 729, wherein the acceptance 731 may be submitted to the social networking service 702 or, at 732, to the processing platform 107. Further, at 733, the task client 121b will monitor for when the user is able to complete requested task and prompts contact A to deliver the item to the user. In one embodiment, the monitoring may be performed automatically by, for instance, looking for transaction information by contact A related to the requested item or task. In addition or alternatively, contact A may manually input into the task client 121b to indicate that the item has been acquired and is ready for delivery to the user. By way of example, the contact A can arrange the details of delivery to the user (e.g., a location, time, etc.) via the task client 121b, the social networking service 105, and/or the processing platform 107. In another example, the task client 121b may provide contact information for the user so that contact A may contact the user directly to make delivery arrangements.

Figure 7E:
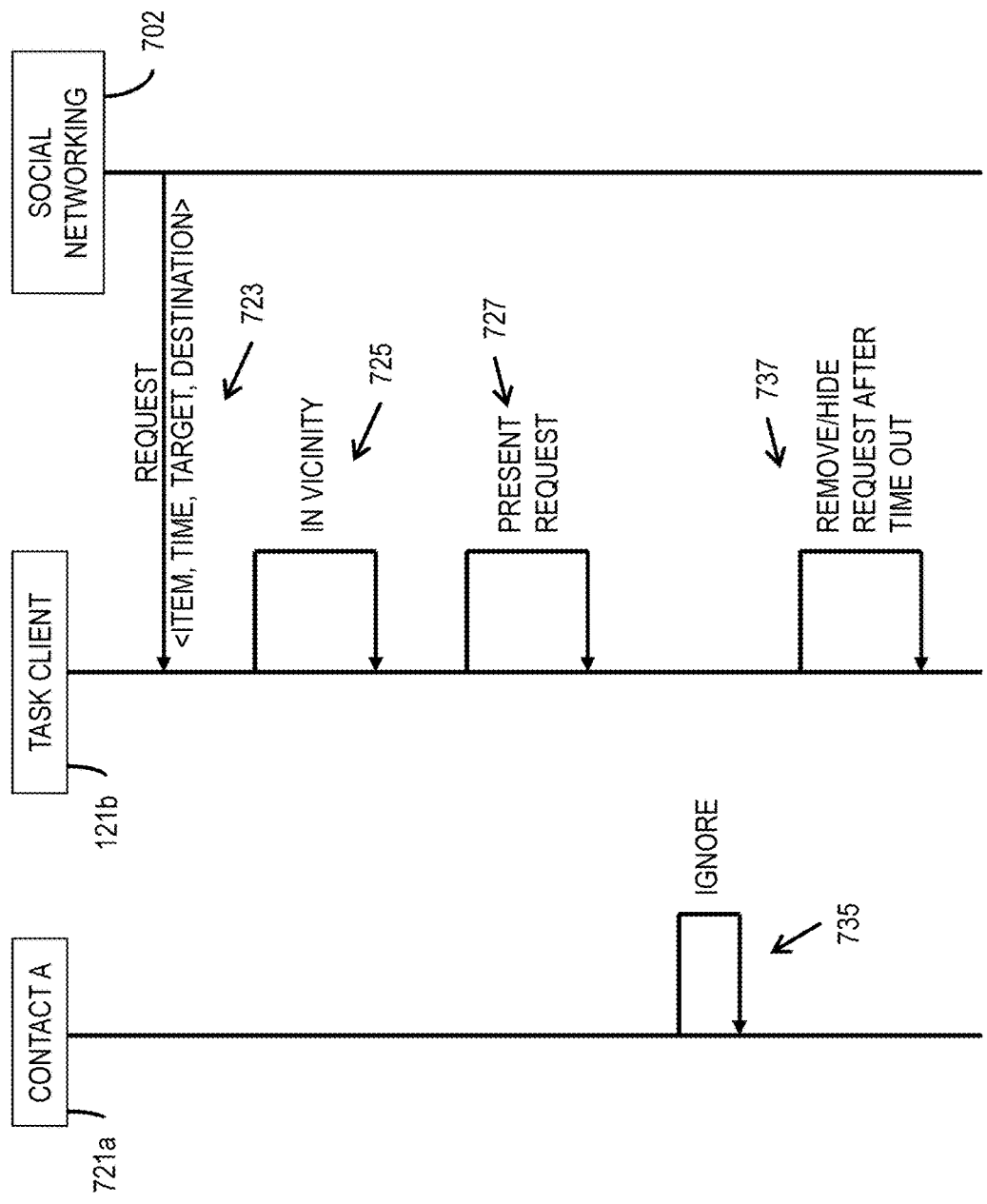

Alternatively, In FIG. 7E, the contact A may not notice the request 723 or at 735 may choose to ignore the request (e.g., with or without sending a response), wherein the task client 121b may remove and/or hide the request at 737 after a predetermined time-out period. In one embodiment, if the user chooses to ignore the request at the UE 101b (e.g., with or without sending a response), then the presentation may be removed/hidden immediately at the UE 101b.

Figure 7F:
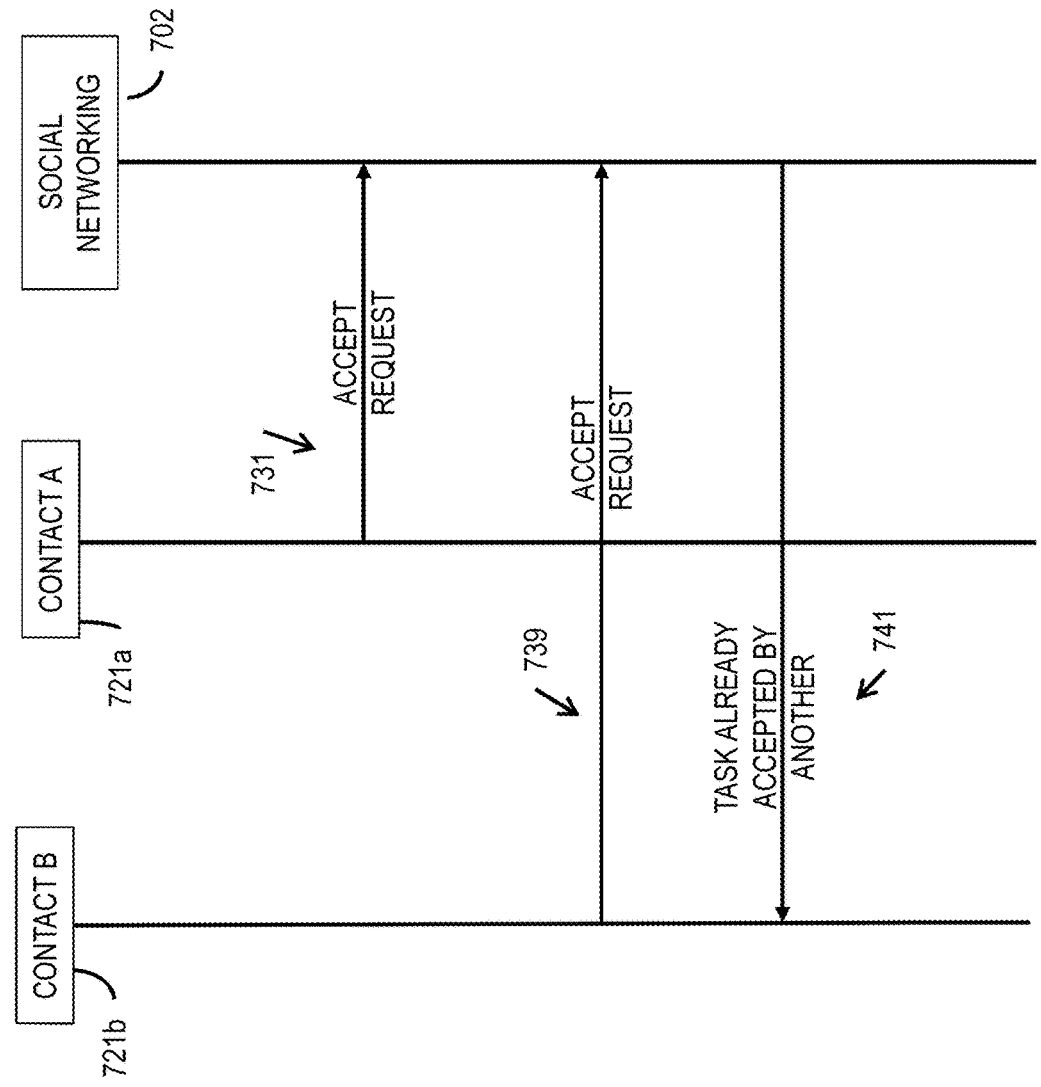

FIG. 7F illustrates a scenario where the social networking service 702 and/or the processing platform 105 have received the acceptance 731 from the contact A and further receive an acceptance 739 from a contact B (721b) where a message/notification 741 may be sent to the contact B to indicate that the request 731 has been already accepted by another person.

Figure 7G:
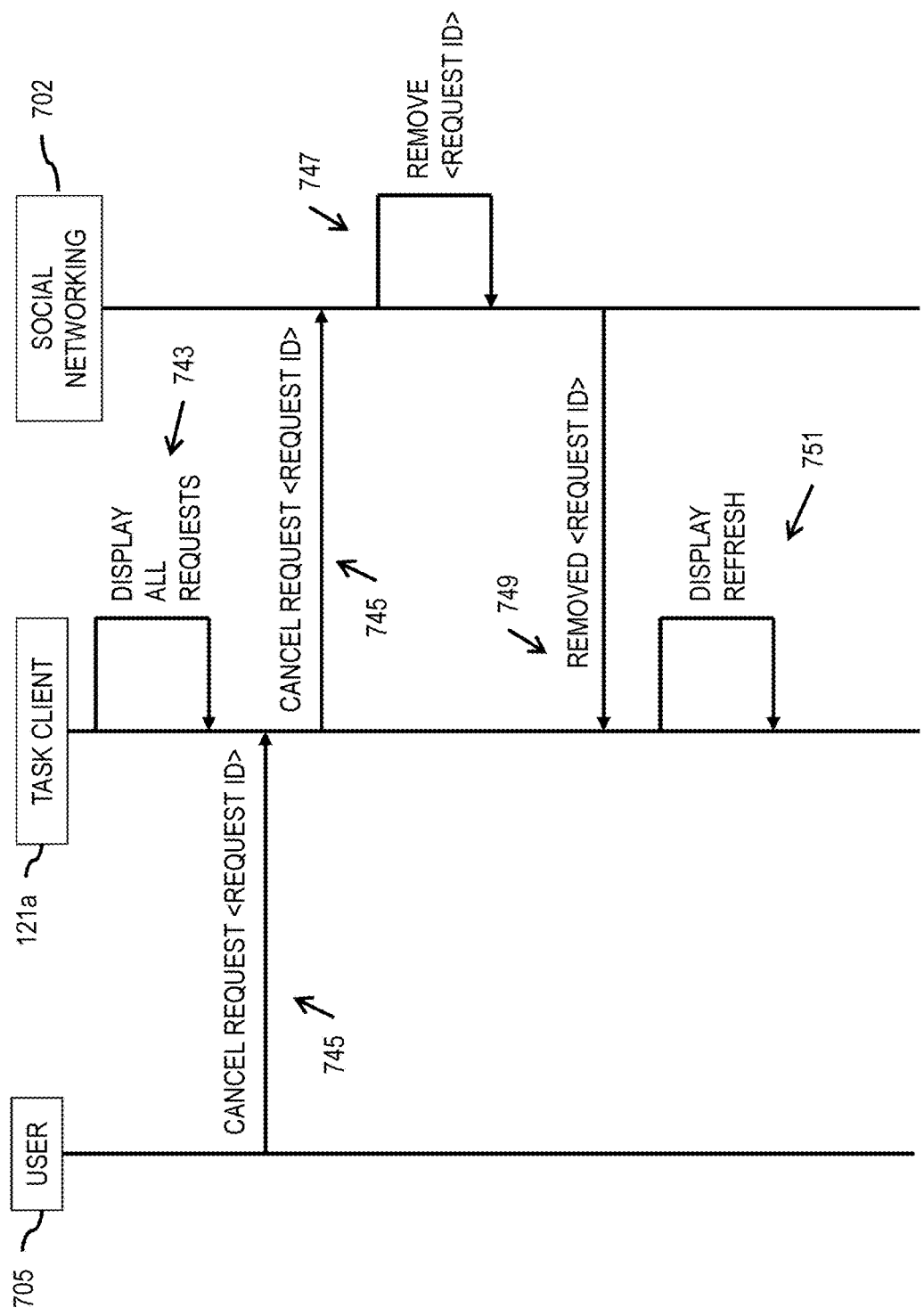

In FIG. 7G. the user 705 may review one or more pending requests 743 via the task client 121a at the UE 101a and may wish to cancel (or suspend) one or more pending requests via a cancel request message 745. Further, the social networking service 702 and/or the processing platform 107 may process the cancel request 745 and remove (suspend) the request at 747 and send a cancellation confirmation message 749 to the task client 121a, wherein the list 743 may be updated at 751.

Figure 8A:
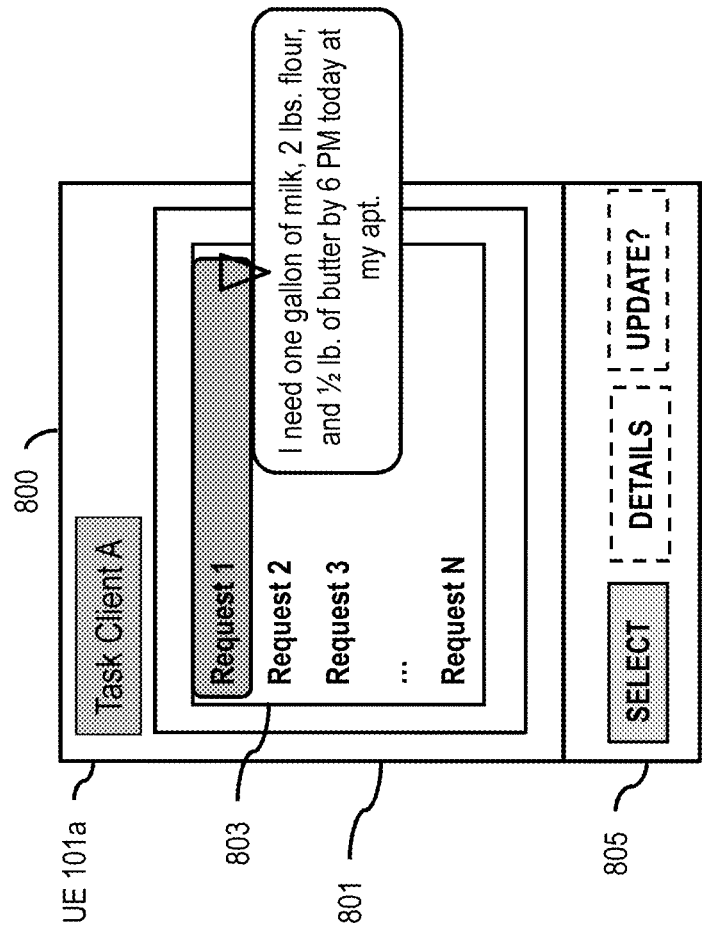
FIGS. 8A through 8C illustrate various user interface diagrams for user interfaces and a processing platform, according to various embodiments.
Figure 8B:
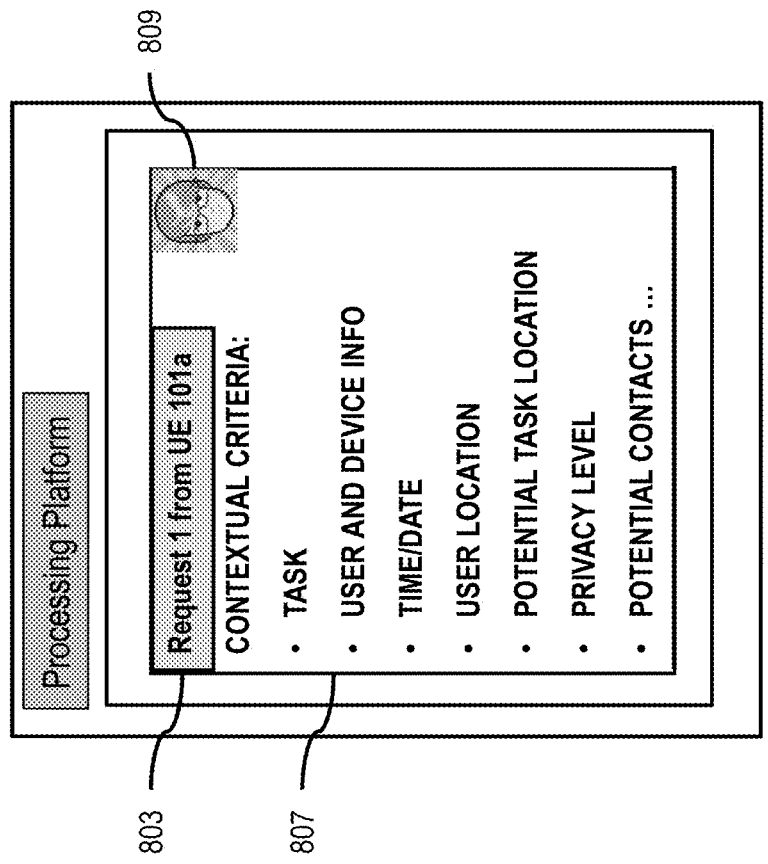
Figure 8C:
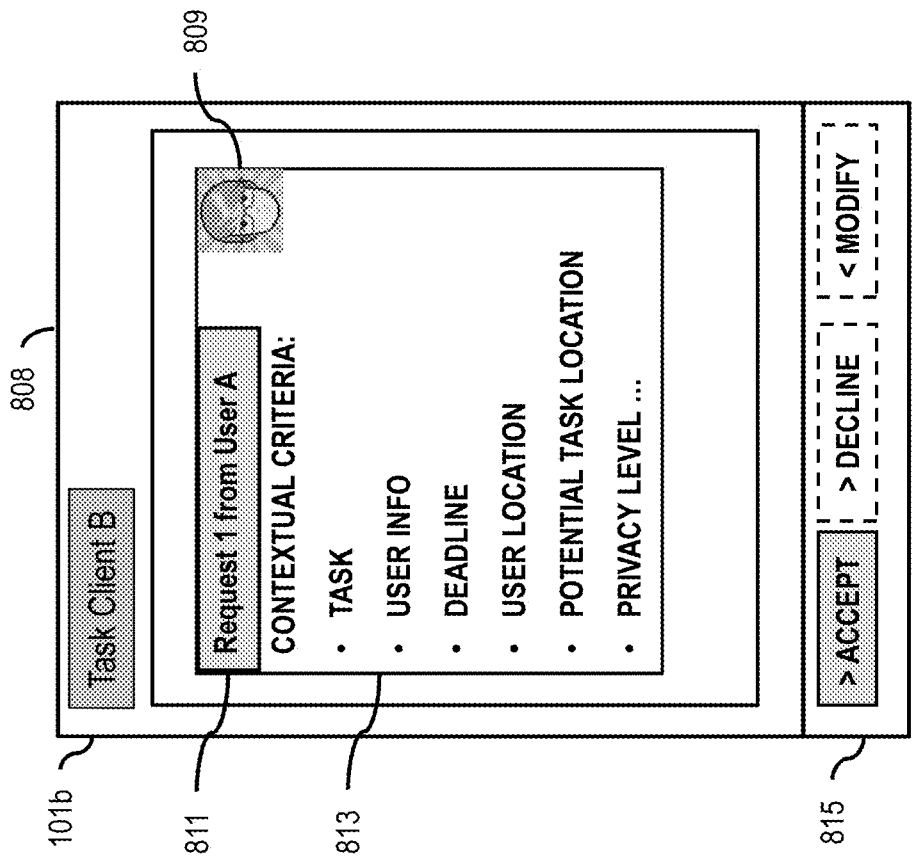

FIGS. 8A through 8C illustrate various diagrams for user interfaces and a processing platform, according to various embodiments.

FIG. 8A depicts a UI 800 for a task client 801 (task client A) at a UE 101a. In various embodiments, a user of the UE 101a may utilize the UI 801 to generate one or more requests 1-N (803) for submission to one or more service providers 105 and/or processing platforms 107 where the user may interact with the requests via options 805, for example, to select, review details, request for update status, and the like. Further, FIG. 8B shows an example diagram at a processing platform 107 where a request "1" (803) from the UE 101a is processed and analyzed for determining associated contextual criteria 807, which may include one or more tasks, user information 809, device information, time/date, user location, and the like. As discussed above, the processing platform 107 may determine one or more potential contacts who may be able to assist with fulfilling the request 803. In FIG. 8C, UI 808 for a task client "B" on a UE 101b is depicted, which may present a request 811 and associated contextual criteria 813, wherein the contextual criteria 813 may be different than the contextual criteria 807 determined at the processing platform 107 in FIG. 8B. For example, the contextual criteria 813 may present information on one or more tasks, user information 809, a deadline for completing the task 811, user location where a meeting may be scheduled for completing (e.g., delivering items) the task 811, privacy level of the task, and the like. In various embodiments, a contact may take one or more actions 815 or may ignore the request.

The processes described herein for efficiently coordinating one or more tasks among a plurality of users may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
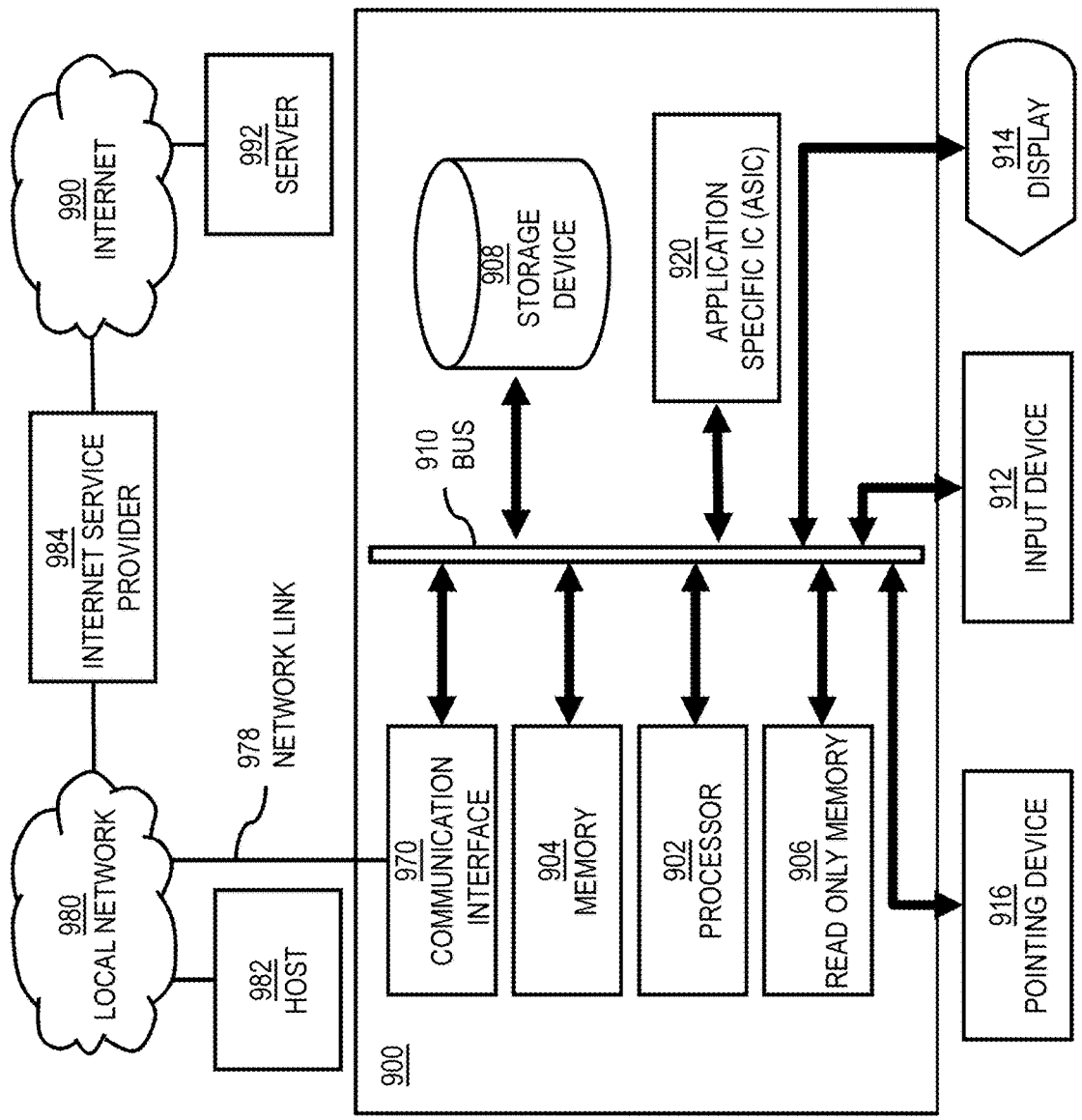
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to efficiently coordinating one or more tasks among a plurality of users as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic, and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of efficiently coordinating one or more tasks among a plurality of users.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to efficiently coordinating one or more tasks among a plurality of users. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for efficiently coordinating one or more tasks among a plurality of users. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for efficiently coordinating one or more tasks among a plurality of users, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, which carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 113 for efficiently coordinating one or more tasks among a plurality of users.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to efficiently coordinating one or more tasks among a plurality of users as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of efficiently coordinating one or more tasks among a plurality of users.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to efficiently coordinating one or more tasks among a plurality of users. The memory 1005 also stores the data associated with or generated by the execution of the inventive steps.

Figure 11:
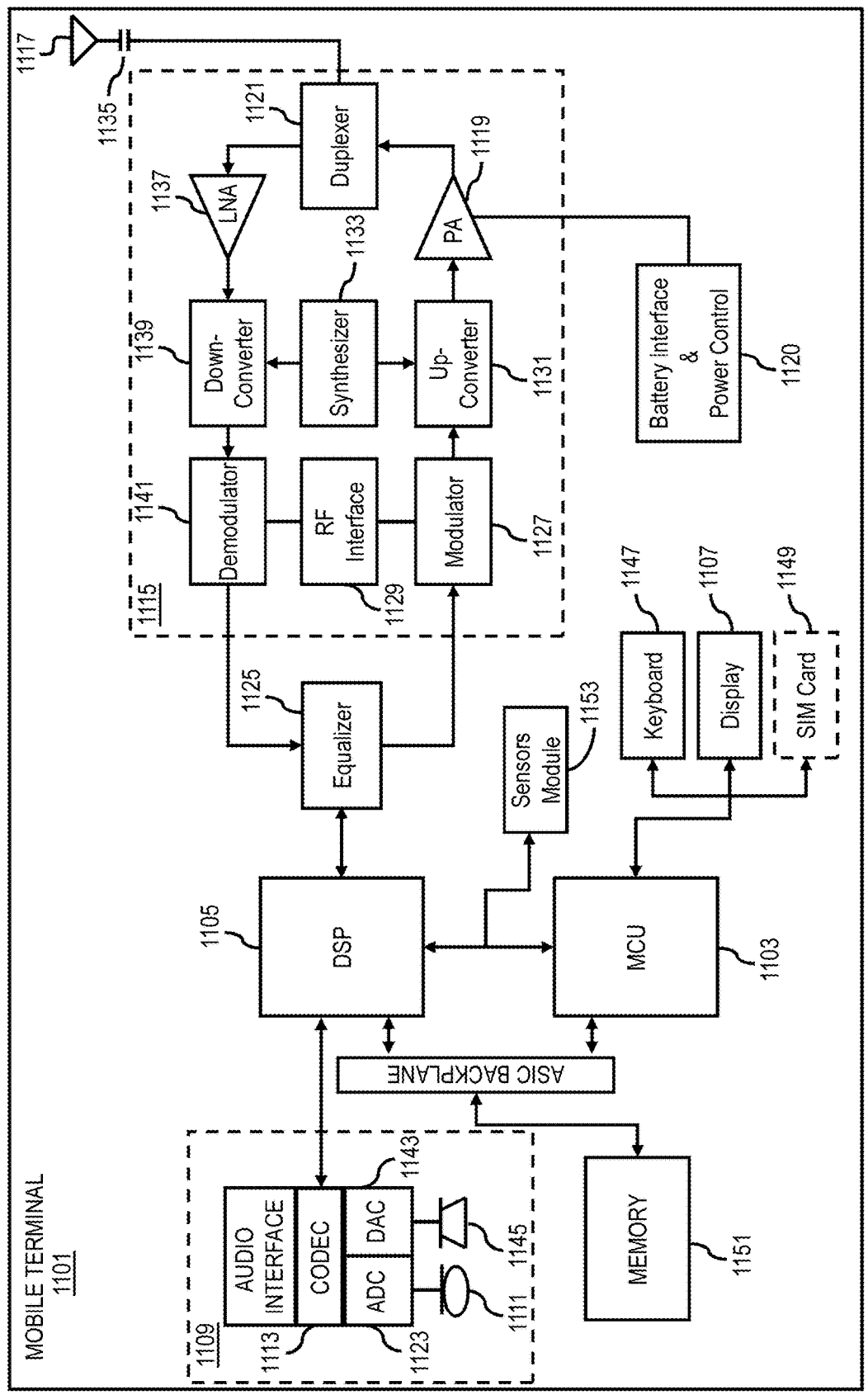
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of efficiently coordinating one or more tasks among a plurality of users. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of efficiently coordinating one or more tasks among a plurality of users. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairment that may occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to efficiently coordinating one or more tasks among a plurality of users. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Additionally, sensors module 1153 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1101 (e.g., a mobile phone), a user of the mobile terminal 1101, an environment of the mobile terminal 1101 and/or the user, or a combination thereof, wherein the data may be collected, processed, stored, and/or shared with one or more components and/or modules of the mobile terminal 1101 and/or with one or more entities external to the mobile terminal 1101.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer implemented method for selectively transmitting a task request to one or more of a plurality of contact devices over a data network comprising:
    receiving, by a processing platform, a request to transmit a task request from a user of a user device, the task request specifying a task location and a predetermined time deadline for completing the task request;
    determining the one or more contact devices from one or more contact lists that are associated with the user of the user device;
    computing a probability distribution that indicates respective probabilities that the one or more contact devices will be in proximity of the user device before the predetermined time deadline;
    selecting a subset of the contact devices based on the probability distribution;
    processing respective geo-location information of the subset of the contact devices to determine a proximity of each contact device in the subset to the task location;
    selecting at least one contact device from the subset based on the determined proximity of each contact device in the subset to the task location; and
    transmitting the task request over the data network to the at least one contact device selected from the subset, wherein the task request is configured to initiate a presentation of the task request on a display of the at least one selected contact device.

2. A method of claim 1, wherein the one or more contact devices are associated with a social network of the user of the user device, and wherein the processing platform is controlled by a service provider.

3. A method of claim 1, further comprising:
processing one or more contextual histories of the one or more contact devices to determine the probability distribution,
wherein the one or more contextual histories include a location history, an activity history, a social messaging history, or a combination thereof.

4. A method of claim 1, further comprising:
purging the presentation of the task request from one or more of the at least one contact device selected from the subset that has not accepted the task request.

5. A method of claim 1, wherein the transmitting and the presentation of the task request is to a first one of the at least one contact device selected from the subset, the method further comprising:
determining that the first one of the at least one contact device selected from the subset has not accepted the task request or has not accepted the task request within the predetermined time deadline; and
transmitting the task request to a second one of the at least one contact device selected from the subset.

6. A method of claim 1, further comprising:
determining that the at least one contact device selected from the subset has accepted the task request; and
determining a meeting schedule for the user device and the at least one contact device selected from the subset.

7. A method of claim 1, further comprising:
determining that the at least one contact device selected from the subset has completed the task request;
updating status information for the task request; and
presenting the status information to the user device.

8. A method of claim 1, further comprising:
presenting the one or more contact devices for selection by the user device; and
determining an input from the user device for selecting from among the one or more contact devices,
wherein the subset is determined from the contact devices selected by the user device.

9. A method of claim 1, wherein the processing of the respective geo-location information of the subset of the contact devices comprises computing another probability distribution that indicates respective probabilities that one or more candidate devices are at or near the task location to determine the proximity to the task location.

10. A method of claim 1, further comprising:
determining the probability distribution based on the one or more contact devices satisfying a contextual criteria, wherein the contextual criteria comprises location of the one or more contact devices, location of a task, the predetermined time deadline, task type, and a privacy level of the task.

11. A method of claim 10, wherein the task associated with the task request is to be performed by a user of the selected at least one contact device, the method further comprising:
determining the privacy level of the task, wherein the selection of the at least one contact device is based on the determined privacy level of the task.

12. An apparatus for selectively transmitting a task request to one or more of a plurality of contact devices over a data network comprising:
at least one processor; and
at least one memory including computer program code for one or more programs,
the at least one memory and the computer program code configured to, with the at least one processor, cause the apparatus to perform at least the following:
receive, from a user of a user device, a request to transmit a task request, the task request specifying a task location and a predetermined time deadline for completing the task request;
determine the one or more contact devices from one or more contact lists that are associated with the user of the user device;
compute a probability distribution that indicates respective probabilities that the one or more contact devices will be in proximity of the user device before the predetermined time deadline;
select a subset of the contact devices based on the probability distribution;
process respective geo-location information of the subset of the contact devices to determine a proximity of each contact device in the subset to the task location;
select at least one contact device from the subset based on the determined proximity of each contact device in the subset to the task location; and
transmit the task request over the data network to the at least one contact device selected from the subset, wherein the task request is configured to initiate a presentation of the task request on a display of the at least one selected contact device.

13. An apparatus of claim 12, wherein the one or more contact devices are associated with a social network of the user of the user device, and wherein the apparatus is controlled by a service provider.

14. An apparatus of claim 12, wherein the apparatus is further caused to:
process one or more contextual histories of the one or more contact devices to determine the probability distribution,
wherein the one or more contextual histories include a location history, an activity history, a social messaging history, or a combination thereof.

15. An apparatus of claim 12, wherein the apparatus is further caused to:
purge the presentation of the task request from one or more of the at least one contact device selected from the subset that has not accepted the task request.

16. An apparatus of claim 12, wherein the transmitting and the presentation of the task request is to a first one of the at least one contact device selected from the subset, the apparatus is further caused to:
determine that the first one of the at least one contact device selected from the subset has not accepted the task request or has not accepted the task request within the predetermined time deadline; and
transmit the task request to a second one of the at least one contact device selected from the subset.

17. An apparatus of claim 12, wherein the apparatus is further caused to:
determine that the at least one contact device selected from the subset has accepted the task request; and
determine a meeting schedule for the user device and the at least one contact device selected from the subset.

18. An apparatus of claim 12, wherein the apparatus is further caused to:
determine that the at least one contact device selected from the subset has completed the task request;
update status information for the task request; and
present the status information to the user device.

19. An apparatus of claim 12, wherein the apparatus is further caused to:
presenting the one or more contact devices for selection by the user device; and determine an input from the user device for selecting from among the one or more contact devices, wherein the subset is determined from the contact devices selected by the user device.

20. An apparatus of claim 12, wherein the processing of the respective geo-location information of the subset of the contact devices comprises computing another probability distribution that indicates respective probabilities that one or more candidate devices are at or near the task location to determine the proximity to the task location.

* * * * *